US012639925B1

(12) United States Patent
Vashi

(10) Patent No.: US 12,639,925 B1
(45) Date of Patent: May 26, 2026

(54) USING AN ARTIFICIAL INTELLIGENCE MODEL TO IDENTIFY A WASTE CLASSIFICATION FOR A SOLID WASTE OBJECT

(71) Applicant: Aarush Vashi, San Jose, CA (US)

(72) Inventor: Aarush Vashi, San Jose, CA (US)

( * ) Notice: Subject to any disclaimer, the term of this patent is extended or adjusted under 35 U.S.C. 154(b) by 0 days.

(21) Appl. No.: 19/333,026

(22) Filed: Sep. 18, 2025

Related U.S. Application Data

(60) Provisional application No. 63/746,808, filed on Jan. 17, 2025.

(51) Int. Cl.
| | |
|---|---|
| *G06V 10/764* | (2022.01) |
| *G06V 10/774* | (2022.01) |
| *G06V 10/776* | (2022.01) |
| *G06V 20/52* | (2022.01) |
| *G06V 20/70* | (2022.01) |
| *H04N 23/50* | (2023.01) |
| *H04N 23/61* | (2023.01) |
| *H04N 23/695* | (2023.01) |
| *G06V 10/94* | (2022.01) |

(52) U.S. Cl.
CPC ........ *G06V 10/764* (2022.01); *G06V 10/7747* (2022.01); *G06V 10/776* (2022.01); *G06V 20/52* (2022.01); *G06V 20/70* (2022.01); *H04N 23/555* (2023.01); *H04N 23/61* (2023.01); *H04N 23/695* (2023.01); *G06V 10/95* (2022.01)

(58) Field of Classification Search
CPC .. G06V 10/95; G06V 10/764; G06V 10/7747; G06V 20/52; G06V 20/70; H04N 23/61; H04N 23/555; H04N 23/695
See application file for complete search history.

(56) References Cited

U.S. PATENT DOCUMENTS

| | | |
|---|---|---|
| 10,354,232 B2 | 7/2019 | Tomlin et al. |
| 10,482,120 B2 | 11/2019 | Ripley |
| 10,824,936 B2 | 11/2020 | Wu et al. |

(Continued)

FOREIGN PATENT DOCUMENTS

| | | |
|---|---|---|
| CN | 113680794 B | 6/2022 |
| KR | 102038807 B1 | 10/2019 |

(Continued)

OTHER PUBLICATIONS

Gao, et al. (Computer English translation of Chinese patent No. CN 112101149 A). (Year: 2020).*
Lee (Computer English Translation of Korean Patent No. Kr 102696029B1). (Year: 2022).*
Ueno, et al. (Computer English Translation of Japanese Patent No. JP2023-127804a). (Year: 2022).*

(Continued)

*Primary Examiner* — Daniel G Mariam
(74) *Attorney, Agent, or Firm* — Eric Kohli

(57) ABSTRACT

Methods for training and using an artificial intelligence (AI) model to identify a waste classification for a waste object. The method to train the AI model includes generating training data and providing the training data to train the AI model on (i) a set of training inputs and (ii) a set of target outputs. A first training input includes first data representing first images of a first solid waste. A second training input includes second data representing second images of a second solid waste. A first target output identifies a first waste label corresponding to landfill waste. A second target output identifies a second waste label corresponding to recyclable waste.

26 Claims, 10 Drawing Sheets

(56) References Cited

U.S. PATENT DOCUMENTS

| | | | |
|---|---|---|---|
| 10,835,927 | B2 | 11/2020 | Torriere |
| 11,335,086 | B2 | 5/2022 | Jenkins et al. |
| 11,780,094 | B2 | 10/2023 | Ha |
| 11,788,877 | B2 | 10/2023 | Balachandran et al. |
| 12,128,567 | B2 | 10/2024 | Horowitz et al. |
| 12,162,041 | B2 | 12/2024 | Murad et al. |
| 2021/0287357 | A1 | 9/2021 | Horowitz et al. |
| 2021/0299706 | A1 | 9/2021 | Filler et al. |
| 2022/0331841 | A1 | 10/2022 | Filler et al. |
| 2024/0402934 | A1 | 12/2024 | Miller et al. |

FOREIGN PATENT DOCUMENTS

| | | | | | |
|---|---|---|---|---|---|
| WO | 2017161686 | A1 | | 9/2017 | |
| WO | WO-2023229538 | A1 | * | 11/2023 | ............ B07C 7/005 |
| WO | WO-2024115454 | A1 | * | 6/2024 | ............ G06V 10/26 |

OTHER PUBLICATIONS

Li, et al. (Computer English Translation of Chinese Patent No. CN117993898 A). (Year: 2024).*

Moore, A., "AI-Powered Waste Management System to Revolutionize Recycling," Nov. 9, 2023, 3 pages, NC State University: College of Natural Resources, Forest Biomaterials Research, https://cnr.ncsu.edu/news/2023/11/ai-waste-management/.

Berk, B., "Trash Pickup's Future: Self-Driving Bins, Quieter Trucks and Hassle-Free Recycling," Aug. 28, 2025, 6 pages, The Wall Street Journal, https://www.wsj.com/tech/ai/trash-collection-new-technology-2d3dcf6a?mod=article_inline.

AMP: "Next-Gen Recycling," 12 pages, [Retrieved online on Sep. 17, 2025] Retrieved from URL: https://ampsortation.com/products/single-stream.

VIMEO: "AMP ONE Cleveland Case Study," 2 pages, [Retrieved online on Sep. 17, 2025] Retrieved from URL: https://vimeo.com/908132009/9883df941f.

* cited by examiner

300

| Initialize training set T to { } | 301 |

| Generate one or more first images including first images of a first solid waste and second images of a second solid waste | 302 |

| Generate a first training input including first data representing first images of a first solid waste | 303 |

| Generate a second training input including second data representing second images of a second solid waste | 304 |

| Generate a first target output for the first training input that identifies a first waste label corresponding to landfill waste | 305 |

| Generate a second target output for the second training input that identifies a second waste label corresponding to recyclable waste | 306 |

| FIG. 3B | 307 |

| Generate an input/output mapping | 308 |

| Add input/output mapping to training set T | 309 |

Is set T sufficient for training?  310

NO

YES

| Provide training set T to train machine learning model | 311 |

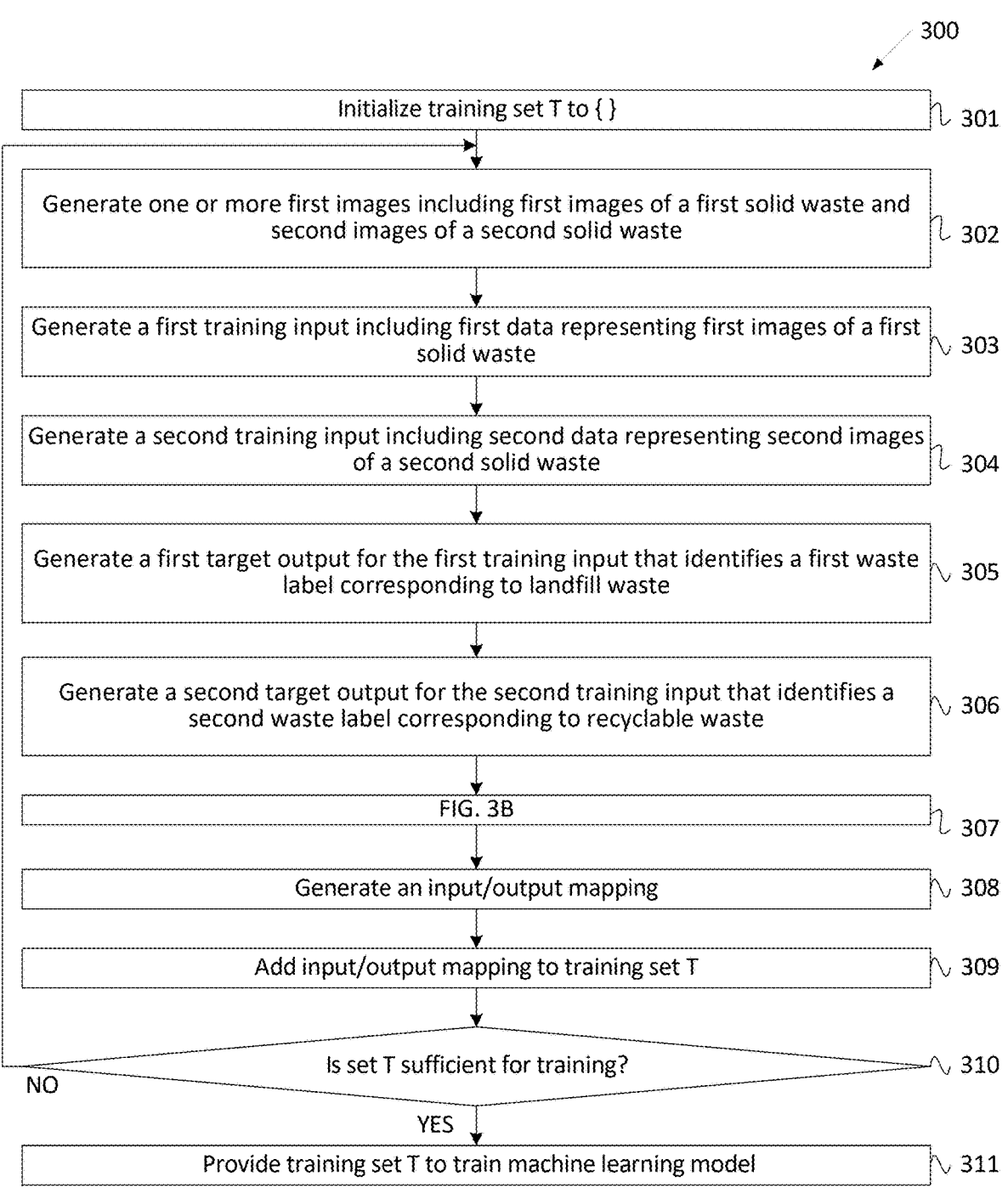

FIG. 3A

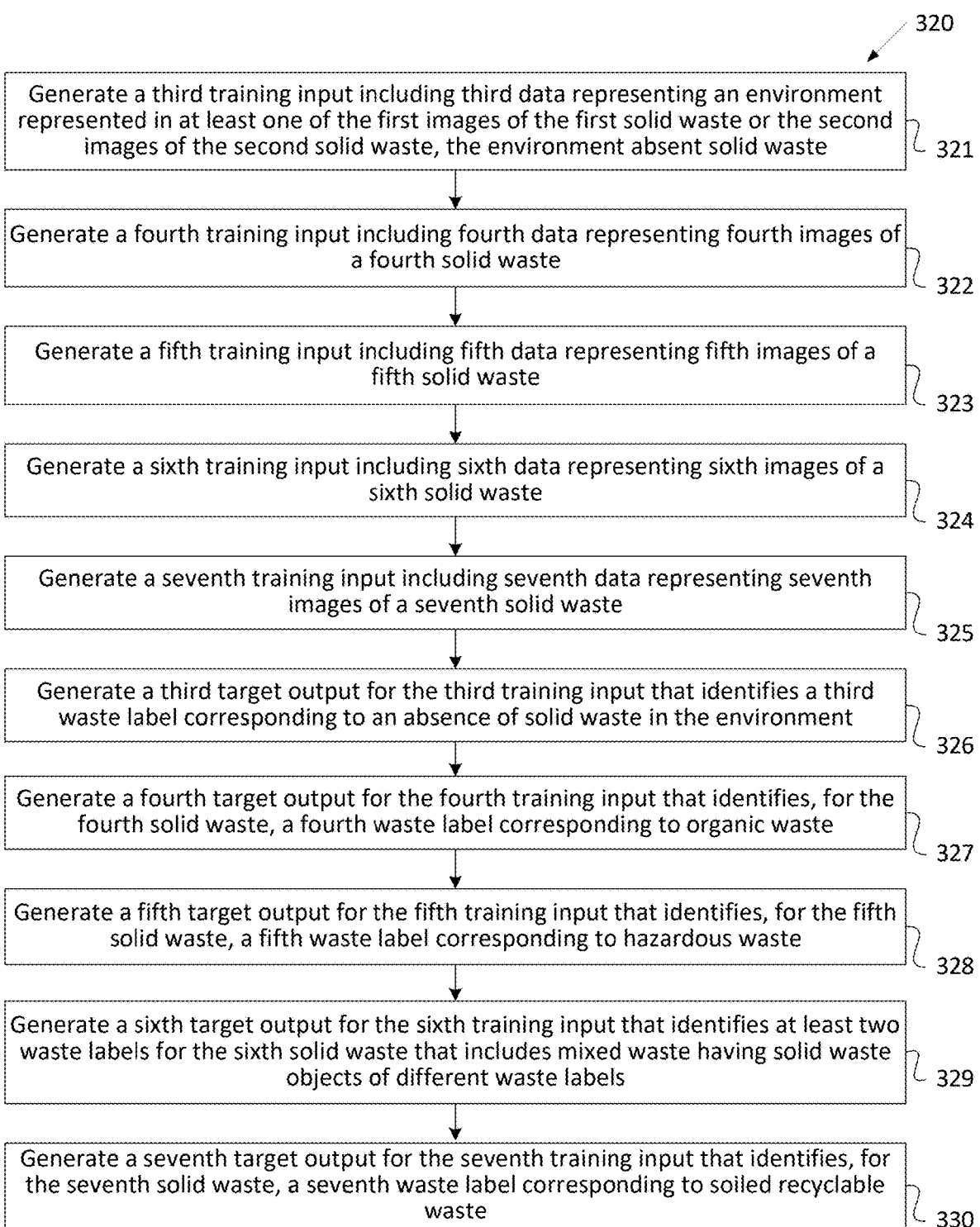

320

Generate a third training input including third data representing an environment represented in at least one of the first images of the first solid waste or the second images of the second solid waste, the environment absent solid waste — 321

Generate a fourth training input including fourth data representing fourth images of a fourth solid waste — 322

Generate a fifth training input including fifth data representing fifth images of a fifth solid waste — 323

Generate a sixth training input including sixth data representing sixth images of a sixth solid waste — 324

Generate a seventh training input including seventh data representing seventh images of a seventh solid waste — 325

Generate a third target output for the third training input that identifies a third waste label corresponding to an absence of solid waste in the environment — 326

Generate a fourth target output for the fourth training input that identifies, for the fourth solid waste, a fourth waste label corresponding to organic waste — 327

Generate a fifth target output for the fifth training input that identifies, for the fifth solid waste, a fifth waste label corresponding to hazardous waste — 328

Generate a sixth target output for the sixth training input that identifies at least two waste labels for the sixth solid waste that includes mixed waste having solid waste objects of different waste labels — 329

Generate a seventh target output for the seventh training input that identifies, for the seventh solid waste, a seventh waste label corresponding to soiled recyclable waste — 330

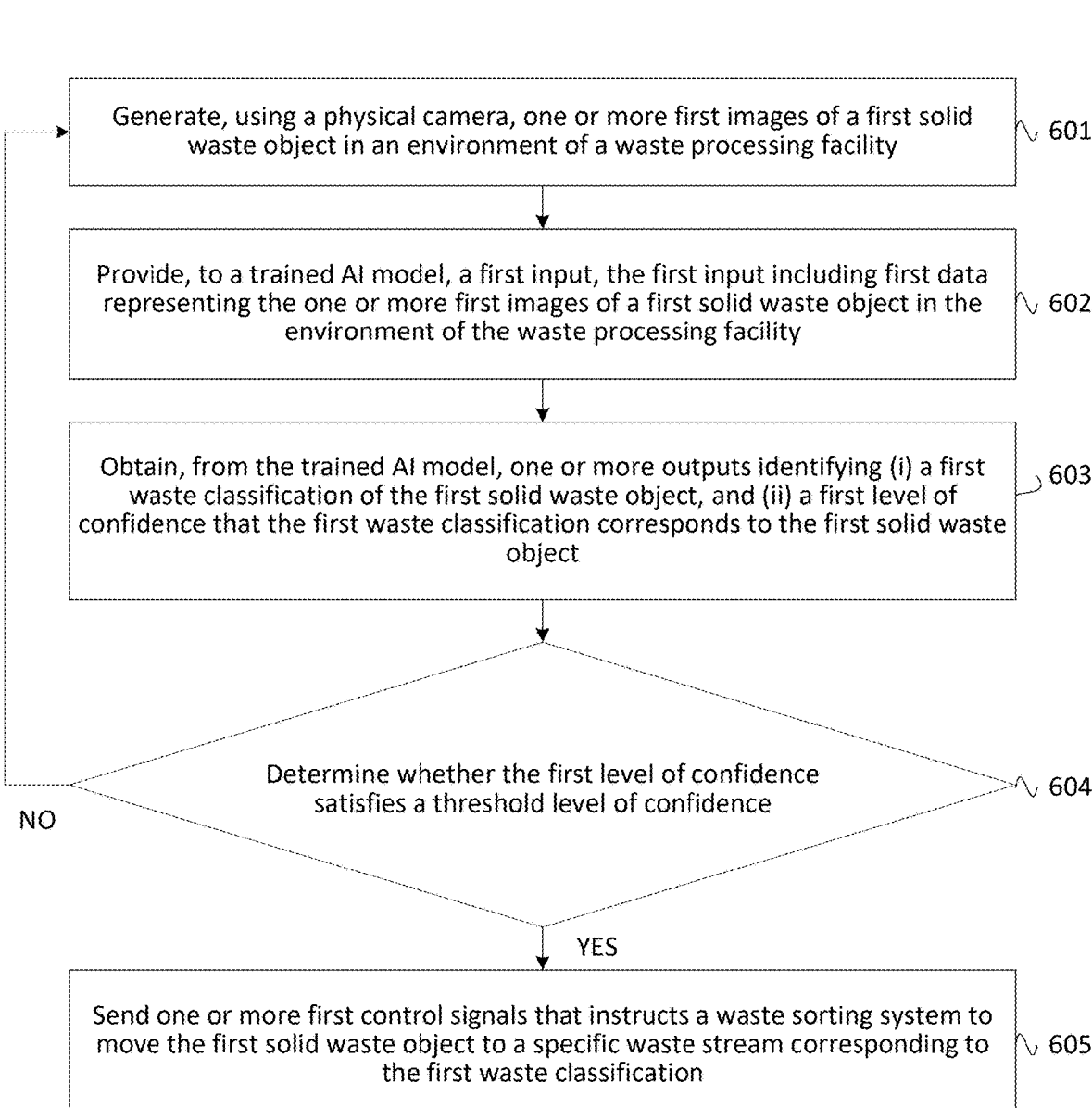

Generate, using a physical camera, one or more first images of a first solid waste object in an environment of a waste processing facility ∿ 601

Provide, to a trained AI model, a first input, the first input including first data representing the one or more first images of a first solid waste object in the environment of the waste processing facility ∿ 602

Obtain, from the trained AI model, one or more outputs identifying (i) a first waste classification of the first solid waste object, and (ii) a first level of confidence that the first waste classification corresponds to the first solid waste object ⟩ 603

Determine whether the first level of confidence satisfies a threshold level of confidence ∿ 604

NO

YES

Send one or more first control signals that instructs a waste sorting system to move the first solid waste object to a specific waste stream corresponding to the first waste classification ∿ 605

FIG. 6A

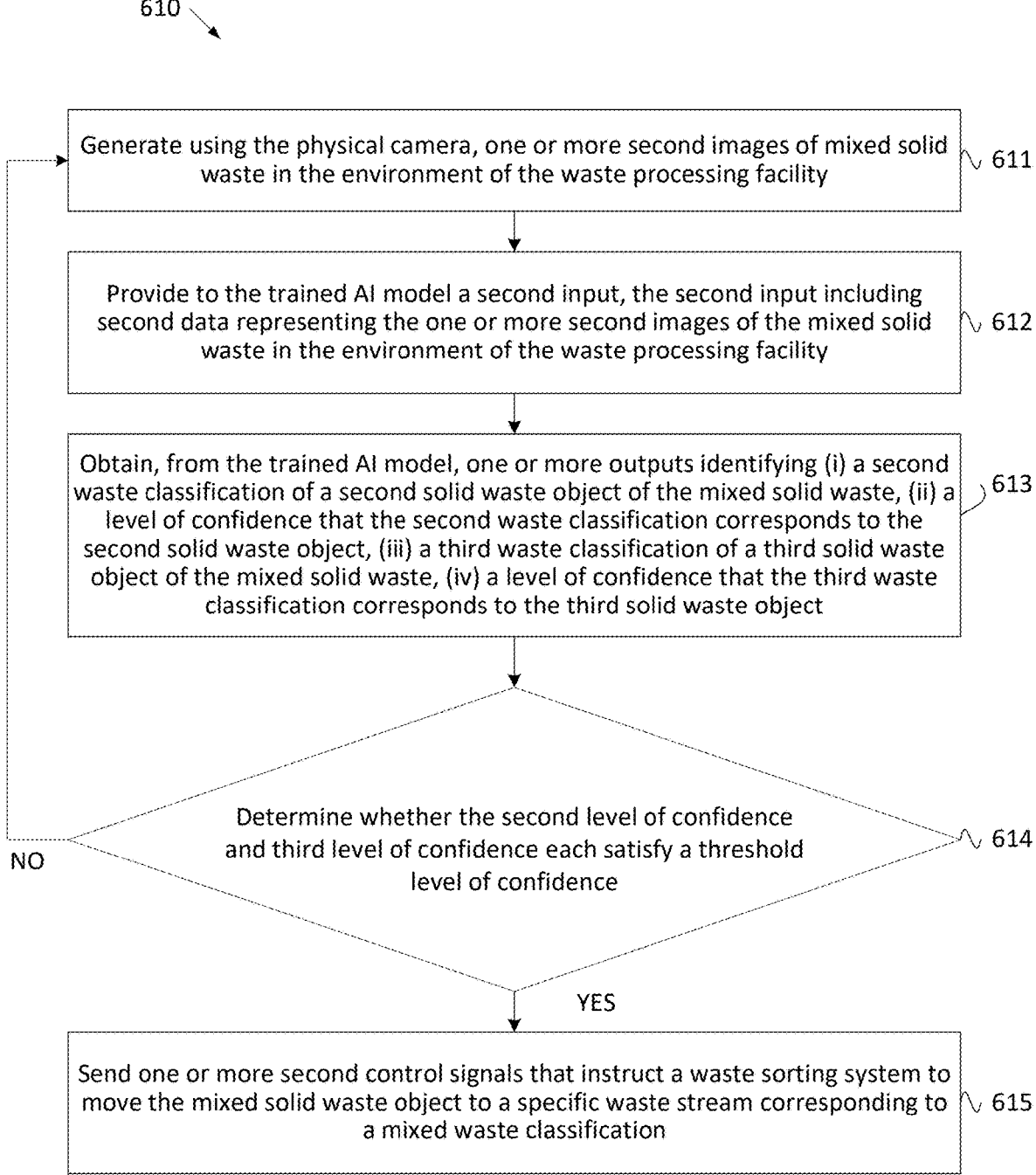

610

Generate using the physical camera, one or more second images of mixed solid waste in the environment of the waste processing facility ⌐ 611

Provide to the trained AI model a second input, the second input including second data representing the one or more second images of the mixed solid waste in the environment of the waste processing facility ⌐ 612

Obtain, from the trained AI model, one or more outputs identifying (i) a second waste classification of a second solid waste object of the mixed solid waste, (ii) a level of confidence that the second waste classification corresponds to the second solid waste object, (iii) a third waste classification of a third solid waste object of the mixed solid waste, (iv) a level of confidence that the third waste classification corresponds to the third solid waste object ⌐ 613

Determine whether the second level of confidence and third level of confidence each satisfy a threshold level of confidence ⌐ 614

NO

YES

Send one or more second control signals that instruct a waste sorting system to move the mixed solid waste object to a specific waste stream corresponding to a mixed waste classification ⌐ 615

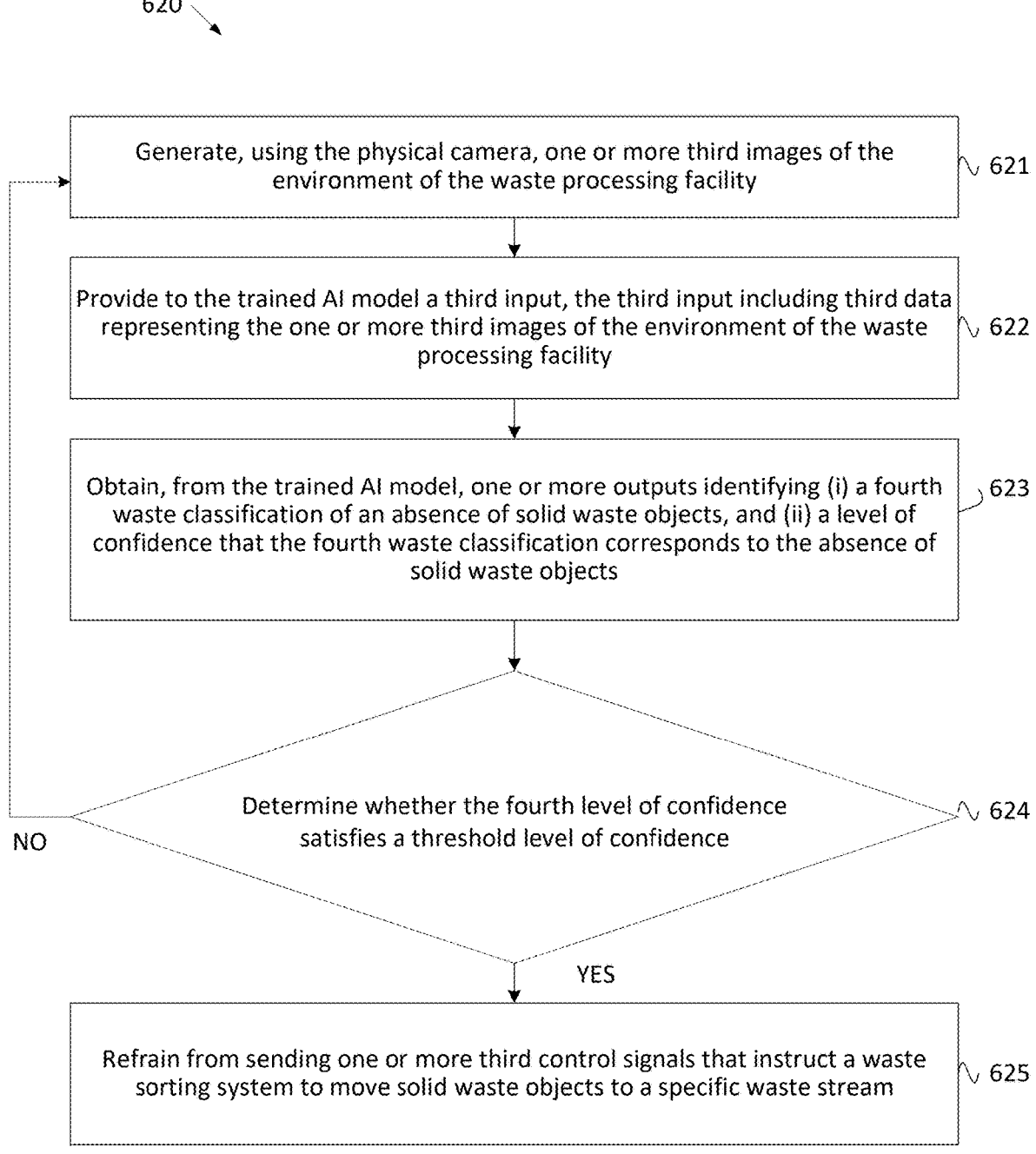

Generate, using the physical camera, one or more third images of the environment of the waste processing facility — 621

Provide to the trained AI model a third input, the third input including third data representing the one or more third images of the environment of the waste processing facility — 622

Obtain, from the trained AI model, one or more outputs identifying (i) a fourth waste classification of an absence of solid waste objects, and (ii) a level of confidence that the fourth waste classification corresponds to the absence of solid waste objects — 623

Determine whether the fourth level of confidence satisfies a threshold level of confidence — 624

NO

YES

Refrain from sending one or more third control signals that instruct a waste sorting system to move solid waste objects to a specific waste stream — 625

FIG. 6C

USING AN ARTIFICIAL INTELLIGENCE MODEL TO IDENTIFY A WASTE CLASSIFICATION FOR A SOLID WASTE OBJECT

RELATED APPLICATIONS

This application claims the benefit of U.S. Provisional Application No. 63/746,808 filed Jan. 17, 2025, the entire contents of which are hereby incorporated by reference in its entirety herein.

TECHNICAL FIELD

Aspects and embodiments of the disclosure relate to image processing, and more specifically, to using an artificial intelligence (AI) model to identify a waste classification for a solid waste object.

BACKGROUND

Artificial intelligence (AI) models can help address complex problems across various fields. By leveraging sophisticated algorithms and extensive training data, an AI model can decipher intricate data patterns, extract crucial insights, and make informed predictions.

SUMMARY

The following is a simplified summary of the disclosure to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An embodiment of the disclosure provides a computer-implemented method for training an artificial intelligence (AI) model, the method including: generating training data for an artificial intelligence (AI) model, where generating the training data includes: generating a first training input, the first training input including first data representing first images of a first solid waste; generating a second training input, the second training input including second data representing second images of a second solid waste; generating a first target output for the first training input, where the first target output identifies, for the first solid waste represented in the first images, a first waste label, among a set of waste labels, corresponding to landfill waste; generating a second target output for the second training input, where the second target output identifies, for the second solid waste represented in the second images, a second waste label, among the set of waste labels, corresponding to recyclable waste; and providing the training data to train the AI model on (i) a set of training inputs including the first training input and the second training input, and (ii) a set of target outputs including the first target output and the second target output.

In some embodiments, generating the training data further includes: generating a third training input, the third training input including third data representing an environment represented in at least one of the first images of the first solid waste or the second images of the second solid waste, the environment absent solid waste; and generating a third target output for the third training input, where the third target output identifies a third waste label, among the set of waste labels, corresponding to an absence of solid waste in the environment, where (i) the set of training inputs includes the third training input, and (ii) the set of target outputs includes the third target output.

In some embodiments, the environment absent solid waste includes a conveyer belt of a waste sorting system.

In some embodiments, generating the training data further includes: generating a fourth training input, the fourth training input including fourth data representing fourth images of a fourth solid waste; and generating a fourth target output for the fourth training input, where the fourth target output identifies, for the fourth solid waste represented in the fourth images, a fourth waste label, among the set of waste labels, corresponding to organic waste, and where (i) the set of training inputs includes the fourth training input, and (ii) the set of target outputs includes the fourth target output.

In some embodiments, generating the training data further includes: generating a fifth training input, the fifth training input including fifth data representing fifth images of a fifth solid waste; and generating a fifth target output for the fifth training input, where the fifth target output identifies, for the fifth solid waste represented in the fifth images, a fifth waste label, among the set of waste labels, corresponding to hazardous waste, and where (i) the set of training inputs includes the fifth training input, and (ii) the set of target outputs includes the fifth target output.

In some embodiments, the method further includes: generating, using a physical camera maintained at a fixed position and fixed orientation relative to an environment of a waste processing facility, one or more images including the first images of the first solid waste and the second images of the second solid waste In some embodiments, an environment represented in the first images and the second images is a same environment.

In some embodiments, the first images of the first solid waste represent the first solid waste in a variety of conditions including at least two of an intact condition, a deformed condition, a soiled condition, a fragmented condition, or a compacted condition.

In some embodiments, the first images of the first solid waste represent the first solid waste in a variety of orientations.

In some embodiments, generating the training data further includes: generating a sixth training input, the sixth training input including sixth data representing sixth images of a sixth solid waste; and generating a sixth target output for the sixth training input, where the sixth target output identifies, for the sixth solid waste represented in the sixth images, at least two waste labels among the set of waste labels, where the sixth solid waste includes mixed waste having solid waste objects of different waste labels, and where (i) the set of training inputs includes the sixth training input, and (ii) the set of target outputs includes the sixth target output.

In some embodiments, generating the training data further includes: generating a seventh training input, the seventh training input including seventh data representing seventh images of a seventh solid waste; and generating a seventh target output for the seventh training input, where the seventh target output identifies, for the seventh solid waste represented in the seventh images, a seventh waste label, among the set of waste labels, corresponding to soiled recyclable waste and where (i) the set of training inputs includes the seventh training input, and (ii) the set of target outputs includes the seventh target output.

An embodiment of the disclosure provides a computer-implemented method for using a trained AI model the method including: generating, using a physical camera, one or more first images of a first solid waste object in an environment of a waste processing facility; providing to the trained AI model a first input, the first input including first data representing the one or more first images of a first solid waste object in the environment of the waste processing facility; and obtaining, from the trained AI model, one or more outputs identifying (i) a first waste classification, among a set of waste classifications, of the first solid waste object in the environment represented in the one or more first images, and (ii) a first level of confidence that the first waste classification corresponds to the first solid waste object in the environment represented in the one or more first images.

In some embodiments, the method further includes: determining whether the first level of confidence that the first waste classification corresponds to the first solid waste object in the environment represented in the one or more first images satisfies a threshold level of confidence; and responsive to determining that the first level of confidence satisfies the threshold level of confidence, sending one or more first control signals that instructs a waste sorting system to move the first solid waste object to a specific waste stream, among a set of waste streams, corresponding to the first waste classification.

In some embodiments, the one or more first control signals causes a rotary device to rotate to a predefined position to align a waste disposal container of a set of waste disposal containers in a position to capture the first solid waste object.

In some embodiments, the method further includes: generating, using the physical camera, one or more second images of mixed solid waste in the environment of the waste processing facility; providing to the trained AI model a second input, the second input including second data representing the one or more second images of the mixed solid waste in the environment of the waste processing facility; and obtaining, from the trained AI model, one or more outputs identifying (i) a second waste classification, among the set of waste classifications, of a second solid waste object of the mixed solid waste in the environment represented in the one or more second images, (ii) a second level of confidence that the second waste classification corresponds to the second solid waste object in the environment represented in the one or more second images, (iii) a third waste classification, among the set of waste classifications, of a third solid waste object of the mixed solid waste in the environment represented in the one or more second images, (iv) a third level of confidence that the third waste classification corresponds to the third solid waste object in the environment represented in the one or more second images.

In some embodiments, the method further includes: generating, using the physical camera, one or more third images of the environment of the waste processing facility; providing to the trained AI model a third input, the third input comprising third data representing the one or more third images of the environment of the waste processing facility; and obtaining, from the trained AI model, one or more outputs identifying (i) a fourth waste classification, among the set of waste classifications, of an absence of solid waste objects in the environment represented in the one or more third images, and (ii) a fourth level of confidence that the fourth waste classification corresponds to the absence of solid waste objects in the environment represented in the one or more third images.

In some embodiments, the method further includes: determining whether the fourth level of confidence that the fourth waste classification corresponds to the absence of solid waste objects in the environment represented in the one or more third images satisfies a threshold level of confidence; and responsive to determining that the fourth level of confidence satisfies the threshold level of confidence, refraining from sending one or more third control signals that instruct a waste sorting system to move solid waste objects to a specific waste stream, among a set of waste streams.

In some embodiments, the physical camera is maintained at a fixed position and fixed orientation relative to the environment of the waste processing facility.

A further embodiment(s) of the disclosure provides a system including: a memory; and one or more processing devices coupled to the memory, the one or more processing devices to perform a method according to any aspect or embodiment described herein. A further embodiment(s) of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 3A illustrates a flow diagram of an example method for training an AI model to classify a solid waste object and/or absence of waste objects, in accordance with embodiments of the disclosure.

FIG. 3B illustrates a flow diagram of an example submethod for training an AI model to classify a solid waste object and/or absence of waste objects, in accordance with embodiments of the disclosure.

FIG. 6A illustrates a flow diagram of an example method for using a trained AI model to identify a waste classification for and sort a solid waste object, in accordance with embodiments of the disclosure.

FIG. 6B illustrates a flow diagram of an example method for using a trained AI model to identify a waste classification for and sort a mixed waste object, in accordance with embodiments of the disclosure.

FIG. 6C illustrates a flow diagram of an example method for using a trained AI model to identify a waste classification for an absence of solid waste, in accordance with embodiments of the disclosure.

DETAILED DESCRIPTION

Figure 1:
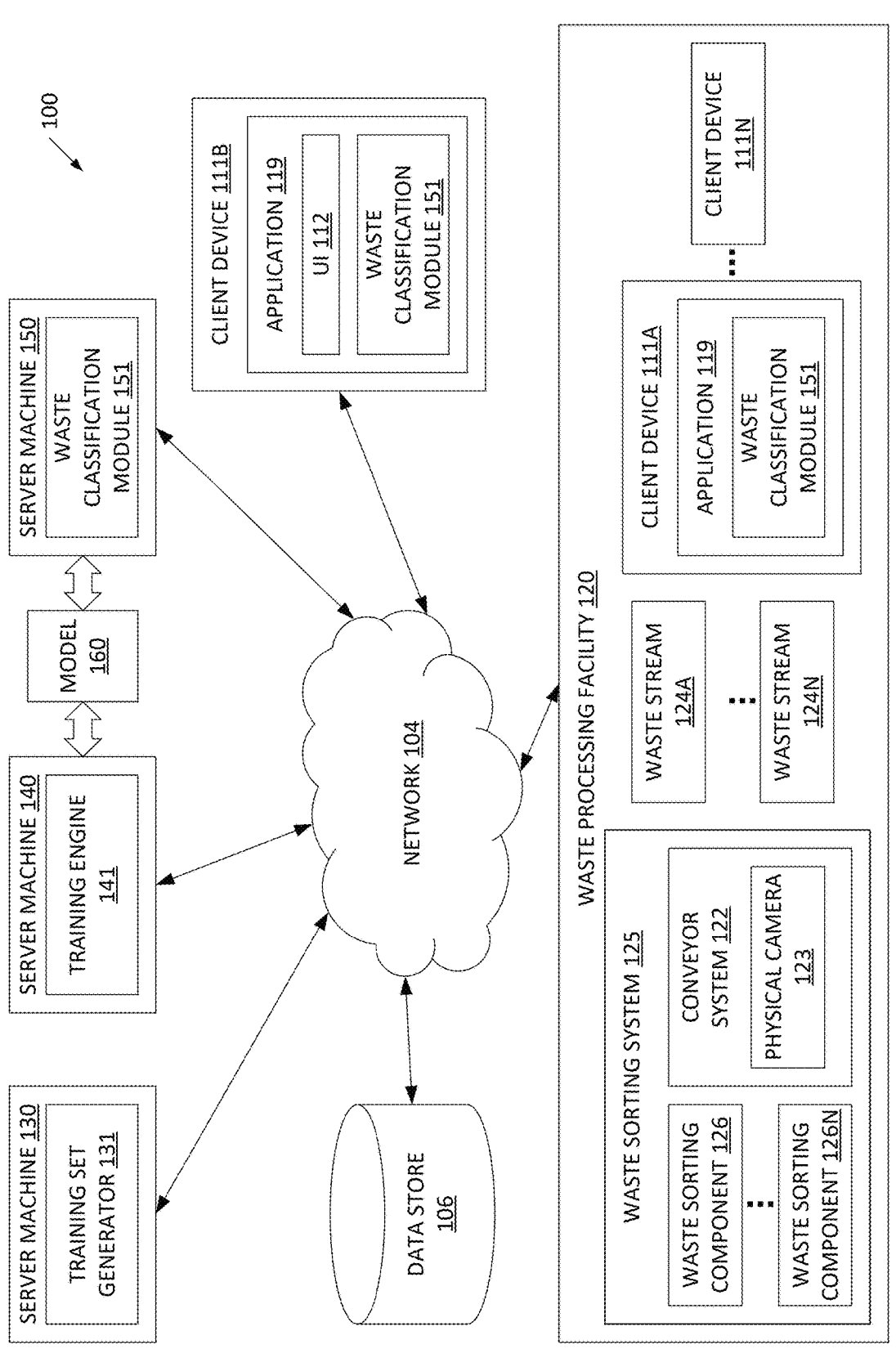
FIG. 1 illustrates an example system, in accordance with embodiments of the disclosure.

Embodiments described herein are related to methods and systems for generating and using an artificial intelligence (AI) model to identify waste classifications for solid waste objects.

A solid waste object can include garbage or refuse generated from human activities (e.g., eating, shopping, and dining). A waste classification can include a categorization for a solid waste object corresponding to a waste stream, or movement of certain waste objects through processing and disposal or reuse. Solid waste can be managed by a waste processing facility. A waste processing facility can include a site or plant used to collect, sort, and process solid waste objects of different waste classifications.

For example, solid waste objects of various waste classifications can be delivered to a waste processing facility (e.g., via a garbage truck), where the solid waste objects are sorted. Sorting can include methods such as pre-sorting, mechanical separation, magnetic separation, air separation, manual sorting, and/or density separation. Pre-sorting is the process of removing large or hazardous items (e.g., chemicals or leaking batteries) before detailed sorting begins. Mechanical separation includes loading waste objects into rotating drums with holes of different sizes to separate waste by size (e.g., smaller food items may fall through holes while larger items remain in the drums). Magnetic separation can include placing magnets above waste items to extract metallic items. Air separation includes using air currents to separate lighter waste objects (e.g., paper) from heavier ones (e.g., glass). Manual sorting uses human workers to manually inspect and sort waste objects. Density separation includes using water baths to separate buoyant materials (e.g., plastic) from non-buoyant materials (e.g., glass).

However, employing multiple sorting methods can be costly, as installing and maintaining advanced sorting systems, such as air separators, can be expensive and require additional staff training to operate the machinery. Additionally, the use of multiple sorting methods can increase energy consumption to power the machinery used in each sorting method. Waste processing facilities may also be subject to space limitations based on the facility's size, as installing multiple conveyor systems and sorting machines can require more space to operate efficiently, which can limit the number of sorting methods they can employ. In addition, some sorting methods, such as manual sorting, can take more time to inspect and sort waste objects, reducing the efficiency of the waste processing facility by limiting the amount of waste that can be sorted within a period of time. As such, it may be difficult for waste processing facilities to employ all or multiple sorting methods.

However, the failure to employ all or multiple sorting methods can increase the likelihood of misclassification of waste objects, as using only one sorting method may not accurately sort all waste objects. For example, magnetic separators may sort metals such as iron and steel, but will not sort other recyclable materials such as aluminum, plastic, and paper. Additionally, current sorting methods may not account for mixed waste, or waste objects including multiple waste objects of different waste classifications (e.g., plastic bags containing food waste), or the condition (e.g., soiled, crumpled, etc.) of waste objects that can affect how the waste object should be sorted. For example, a plastic container covered in food waste may float in a water bath, but the food waste may prevent the plastic container from being recycled without significantly reducing the quality of the recycled product. As such, density separation may incorrectly classify a soiled recyclable waste object as recyclable because it fails to account for the condition of the waste object.

Misclassification of waste can increase landfill use and reduce the efficiency of recycling and resource recovery, as materials that are recyclable or compostable may be sent to landfills. Additionally, the misclassification of hazardous and non-recyclable materials as recyclable can contaminate the recycling stream and reduce the quality and thus economic value of the recycled material. Hazardous materials misclassified as organic materials may incorrectly be composted, which can release toxic substances into the resulting soil, posing a risk to wildlife and human health. As such, determining the proper waste classification for a waste object can require costly and time-consuming processes, and failure to implement such processes increases the risk of misclassifying waste objects, increasing landfill use, reducing the efficiency of recycling and resource recovery, and/or contaminating the environment.

Aspects of the present disclosure address the above-mentioned and other challenges by generating and using data (e.g., image data) representing images depicting solid waste of different types and/or representing images of the absence of solid waste to train an AI model to identify a waste classification for the solid waste object or absence of a solid waste object. In some embodiments, to generate training data, a physical camera can be positioned in a fixed location and/or fixed orientation to, for example, generate images similar to those that would be generated in a waste processing facility or generate the images within the waste processing facility. The images can represent a wide variety of solid waste in a variety of conditions and orientations. In some embodiments, the images can be converted into embeddings, such as image vectors, which can be used as training data to train the AI model. In some embodiments, the trained AI model can be used to accurately classify solid waste. For example, a physical camera can generate one or more images depicting a waste object or absence of waste objects. The image data corresponding to one or more images can be provided as input to the AI model, which can provide, as an output, an indication of a waste classification for the waste object or absence of waste objects. In some embodiments, the classification of the solid waste object(s) can cause a sending of a control signal to the waste sorting system that instructs the waste sorting system to use a waste sorting component to move the solid waste object depicted in the image(s) to a specific waste stream. For example, the solid waste objects can be positioned on a conveyor. The end of the conveyor can include multiple containers, each dedicated to a particular type of waste (e.g., recyclable, landfill, or organic). The control signal can cause a rotary device, such as a servomechanism motor (also referred to as "servo motor" herein), to rotate and position the appropriate containers at the end of the conveyor to capture the classified solid waste object (e.g., recyclable waste in the recyclable container).

As noted, a technical problem addressed by some embodiments of the disclosure is efficient and accurate identification and classification of solid waste objects, as well as the indication of an absence of a solid waste object for the purpose of sorting waste objects in an efficient and accurate manner, where conventional approaches to model training often lack the specificity, robustness, or scalability required for reliable waste classification across diverse object types and imaging conditions.

A technical solution to the above-identified technical problem can include using an AI model and/or other algorithms described herein to improve image processing techniques to accurately identify a waste classification for a waste object or absence of a waste object using data corresponding to one or more images depicting the waste object or an absence of a waste object. Another technical solution is training an AI model with inputs, including image data of waste objects corresponding to different waste categories. As such, a single system can be used to correctly classify waste objects without the implementation of multiple sorting methods, saving time, space, and energy consumption while improving the accuracy of waste classification. Further, the accurate classification of solid waste objects using the AI model can cause the sending of control signals used by the waste sorting system to move the solid waste objects to the appropriate waste streams. Another technical solution to the above-identified technical problem includes the use of an artificial intelligence (AI) model, trained on image data representing various waste objects and environmental conditions, to accurately identify waste classifications or the absence of waste objects. The AI model is trained using a comprehensive set of labeled image data, enabling it to distinguish between different types of waste and to recognize when no waste is present. This training process results in a model that can be deployed in a waste processing facility to process real-time image data captured by cameras, thereby enabling automated, accurate, and efficient classification of waste objects. Further, the training process and image capture techniques (e.g., location and positioning of the camera in a waste processing facility) can improve the images data in a manner that improves image processing and/or the classification capabilities of an AI model. Another technical solution can include training the AI with images of solid waste in a variety of conditions and orientations. Also, the physical camera can be positioned in a fixed position and orientation or be moved to mimic or replicate images taken in a waste processing facility. In addition, some images can include an environment (e.g., common environment with other images) without solid waste. The generated images and techniques, as described above, when used as training data can improve the training of the AI model that improves image processing and classification of solid waste objects.

As noted, another technical problem addressed by some embodiments of the disclosure is the misclassification of waste objects, further exacerbated by the failure to account for mixed waste and the various conditions of waste objects.

A technical solution to the above-identified technical problem can include training the above-mentioned AI model with inputs including image data corresponding to images depicting mixed waste and waste objects in various conditions. For example, the AI model can include a separate waste label for soiled recyclable waste that can no longer be recycled and can be trained using data corresponding to images of recyclable material that is coated in food waste or grease so as to no longer be recyclable. As such, the AI model can be trained to account for mixed waste and the condition of waste objects, decreasing the likelihood of misclassification.

As noted, another technical problem addressed by some embodiments of the disclosure is the improvement in waste sorting, and in particular, automated sorting of solid waste objects at a waste processing facility. The technical problem also encompasses a lack of accurate, efficient, and automated classification and sorting of solid waste objects in real time within a waste processing facility or similar operational environment, where traditional manual or semi-automated methods are limited by speed, accuracy, and scalability.

A technical solution to the above-identified technical problem can include deploying a trained AI model to process image data captured by cameras, classify solid waste objects or detect the absence of such objects, and generate control signals that direct the operation of physical sorting equipment. The control signals can direct physical sorting equipment to move waste objects to the appropriate waste streams (e.g., landfill, recycling, compost), or to indicate the absence of waste for operational efficiency. This system replaces or augments multiple conventional sorting methods, resulting in improved accuracy, reduced operational costs, and enhanced throughput in waste processing facilities.

A "waste processing facility" can refer to a site or plant that handles, treats, and processes waste objects. A waste processing facility can sort waste objects into one of multiple waste classifications and process the waste objects based on the waste classification. For example, a waste processing facility can separate recyclable materials from other waste objects and melt the recyclable materials for reuse.

A "solid waste object" (also referred to as "solid waste" or "waste object" herein) can refer to a solid material, substance or item that is discarded or intended to be discarded. For example, solid waste can include garbage, refuse, or other discarded solid materials generated from human activities (e.g., cooking and eating, cleaning, personal hygiene, or shopping). It can be noted that "waste," "waste object" or "waste item" as referred herein can refer to a solid waste object, unless otherwise described. Solid waste objects can include municipal solid waste (MSW) that include waste that is generated by households, businesses, and institutions that is often managed by a municipality.

A "waste stream" can refer to the movement of waste objects from an origin (e.g., a household) to collection, processing, and final disposal or reuse. Waste streams can include landfill waste, recyclable waste, soiled recyclable waste, hazardous waste, organic waste, and mixed waste. With respect to a waste processing facility, a waste stream can refer to the flow of solid waste objects as they are received, sorted, treated, processed, and/or disposed of at the facility. The waste stream can include the movement of the solid waste objects from collection, entry into the facility, to the final destination or disposition (e.g., recycled material is sold, energy recovery, or landfill disposal).

A "waste classification" can refer to a category of solid waste and/or a process of categorizing a solid waste object into a category (e.g., predefined category) or class based on features or characteristics of the solid waste object. For example, the waste classification can include a classification for a waste object based on a waste stream that corresponds to the waste object. For example, a waste object that is recyclable can be classified as recyclable waste. A waste classification can also refer to a classification that indicates an absence of waste objects. A waste classification can include one or more sub-classifications or any number of levels of sub-classifications (e.g., sub-sub-classification).

FIG. 1 illustrates an example of system 100, in accordance with embodiments of the disclosure. The system 100 includes a waste processing facility 120, one or more server machines 130-150, a data store 106, and client devices 111A-111N connected to network 104. In some embodiments, the system 100 can include one or more platforms (e.g., "third-party platforms").

In some embodiments, network 104 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

In some embodiments, data store 106 can be a persistent storage capable of storing data such as solid waste data, waste absence data, or AI model data. Solid waste data can include landfill waste data, recyclable waste data, soiled recyclable waste data, organic waste data, and hazardous waste data. Data store 106 can be hosted by one or more storage devices, such as main memory, magnetic or optical storage-based disks, tapes or hard drives, network-attached storage (NAS), or storage area network (SAN). In some embodiments, data store 106 can be capable of storing one or more data items, as well as data structures to tag, organize, and index the data items. A data item can include various types of data, including structured data, unstructured data, or vectorized data, or types of digital files, including text data, audio data, image data, video data, multimedia, interactive media, data objects, and/or any suitable type of digital resource, among other types of data. An example of a data item can include a file, database record, database entry, programming code, or document, among others. In some embodiments, data store 106 can include historical information (e.g., historical data items) related to one or more of solid waste data, waste absence data, or the like.

As described above, solid waste data can include landfill waste data, recyclable waste data, soiled recyclable waste data, organic waste data, and hazardous waste data. Each type of solid waste data can refer to data corresponding to image(s) of a solid waste object (e.g., a water bottle or a wrapper) captured by a physical camera 123 on a conveyor system 122 of a waste processing facility 120. Waste absence data can include image data related to images captured by physical camera 123 of the conveyor system 122 that do not depict a solid waste object. Additional details regarding solid waste data and waste absence data are described with reference to FIG. 2.

Sorting can include the process of classifying the waste as a particular type of waste (e.g., landfill waste, compostable waste or recyclable waste) and moving the classified solid waste into the appropriate one of multiple waste streams (e.g., waste stream 124). Each respective waste stream can include specific processing, treatment, and/or disposal based on the waste classification. Waste treatment can prepare the waste for further processing, e.g., by shredding or crushing waste to reduce the size and make the waste easier to handle or process. Treatment may include neutralizing hazardous materials (e.g. adding sodium hydroxide or sodium bicarbonate to an acidic cleaning agent to reduce corrosive properties). Processing can involve converting the waste (e.g., through recycling or incineration) or disposing it (e.g., in a landfill).

In some embodiments, the waste processing facility 120 can include a waste sorting system (e.g., waste sorting system 125) that classifies waste and provides it to an appropriate waste stream 124 corresponding to the classification. In some embodiments, the waste sorting system 125 can include a conveyor system (e.g., conveyor system 122) that transports waste from a staging area to a designated waste stream 124. For example, the waste processing facility 120 can use garbage trucks to deposit waste in a designated area of the waste processing facility 120, where waste is loaded onto the conveyor system 122 for sorting. Depending on the embodiment, the waste can be loaded on the conveyor system 122 using one or more of front-end loaders (machines that scoop waste and load it on the conveyor), grabber claws (machines that grab and lift waste onto the conveyor), and/or hoppers (funnels that direct waste onto the conveyor in controlled amounts).

In some embodiments, the conveyor system 122 can include one or more physical cameras 123 to capture one or more images of waste objects on the conveyor. The physical camera 123 can be fixed in a specific position and orientation relative to the conveyor, in some embodiments. For example, the physical camera 123 can be positioned directly above the conveyor from a specified height (e.g., 1 meter) and a specified orientation and/or angle to capture images of waste objects. Data corresponding to the image(s) of the waste object captured by physical camera 123 can be transmitted to a client device (e.g., client device 111) to classify the waste objects based on the data corresponding to the image(s).

The client device(s) (e.g., client device 111) may each include a type of computing device such as a desktop personal computer (PCs), laptop computer, mobile phone, tablet computer, netbook computer, wearable device (e.g., smartwatch or smart glasses), network-connected television, smart appliance (e.g., video doorbell), or any type of mobile device. Depending on the embodiment, the client devices 111 can be located in the waste processing facility and/or outside of the waste processing facility. In some embodiments, client devices 111 can be one or more computing devices (such as a rackmount server, a router computer, a server computer, a personal computer, a mainframe computer, a laptop computer, a tablet computer, a microcontroller, or a desktop computer), data stores (e.g., hard disks, memories, databases), networks, software components, or hardware components. In some embodiments, client device (s) may also be referred to as a "client device" herein. Although a single client device 111 is shown for purposes of illustration rather than limitation, one or more client devices can be implemented in some embodiments. Client device 111 will be referred to as client device 111 or client devices 111 interchangeably herein.

In some embodiments, one or more client devices 111 can be connected to the system 100. In some embodiments, client devices 111 can present (e.g., display) a user interface (UI) 112 to a user of a respective client device through application 119. The client devices 111 may also collect input from users through input features. For example, a user can provide one or more images depicting a waste object for classification via a client device 111.

In some embodiments, a UI 112 may include various visual elements (e.g., UI elements) and regions, and can be a mechanism by which the user engages with the system 100 at large. In some embodiments, the UI 112 of a client device 111 can include multiple visual elements and regions that enable presentation of information, for decision-making, or debugging content delivery, at a client device 111. In some embodiments, the UI 112 may sometimes be referred to as a graphical user interface (GUI).

In some embodiments, the UI 112 and/or client device 111 can include input features to intake information from a client device 111. In one or more examples, a user of client device 111 can provide input data (e.g., a user query or control commands) into an input feature of the UI 112 or client device 111, for transmission to the system 100 at large. Input features of UI 112 and/or client device 111 can include spaces, regions, or elements of the UI 112 that accept user inputs. For example, input features may include visual elements (e.g., GUI elements) such as buttons, text-entry spaces, selection lists, or drop-down lists. For instance, in some embodiments, input features may include a chat box which a user of client device 111 can use to input textual data (e.g., a user query). The application 119 via client device 111 can then transmit that textual data to the system 100 at large, for further processing. In other examples, input features can include a selection list, in which a user of client device 111 can input selection data, e.g., by selecting or clicking. The application 119 via client device 111 can then transmit that selection data to the system 100 at large, for further processing.

In some embodiments, one or more client devices 111 can include a waste classification module (e.g., waste classification module 151) that classifies waste objects based on data corresponding to image(s) of the waste object captured by the physical camera 123. The waste classification module 151 can receive information from the waste sorting system 125 and/or client device 111 (e.g., data representing image(s) of a waste object) and provide the received information as input to a model (e.g., model 160) trained to classify a waste object based on data representing images of the waste object. The waste classification module 151 can obtain output generated by the model 160 based on the information provided as input. In some embodiments, the waste classification module 151 can include or access the model 160.

In some embodiments, the client device 111 can receive (e.g., from a physical camera 123) data representing image (s) depicting one or more waste objects or an absence of waste objects. The client device 111 can provide the data to the waste classification module 151. In some embodiments, the waste classification module 151 can use the data representing the image(s) as input to a trained AI model, such as model 160. Model 160 can generate one or more outputs. In some embodiments, the waste classification module 151 can perform input preprocessing on data received as input for the model 160. Additional details regarding training the AI model are described below with reference to FIG. 2 and FIG. 3.

The waste classification module 151 can obtain one or more outputs from the AI model (e.g., model 160). In some embodiments, the waste classification module 151 can transmit one or more control signals to the waste sorting system 125 that instruct the waste sorting system to use a waste sorting component (e.g., waste sorting component 126) to move the waste object depicted in the image(s) to a specific waste stream (e.g., waste stream 124). It can be noted that the conveyor system 122 may include one or more waste sorting components 126, in some embodiments. In other embodiments, one or more waste sorting components 126 may not be part of the conveyor system 122. In some embodiments, the waste sorting component 126 can include machinery used to transport waste objects to a specific waste stream 124. In some embodiments, the waste sorting component 126 can include a grabber claw, ram (mechanical device used to push waste to a specific area), blower (mechanical devices that use air currents to separate light materials (e.g., plastic films and paper) from heavier materials), magnet (e.g., to extract metals for recycling), conveyor belt, and/or a rotary device. For example, in some embodiments, a rotary device can be attached to multiple waste disposal containers for different types of waste and rotate, based on a control signal received from the waste classification module 151, to a position such that the waste disposal container corresponding to the classification of a waste object captures the waste object. In other embodiments, the waste classification module can provide the one or more outputs to a client device 111 for presentation to one or more users. In some embodiments, the waste classification module 151 can perform output postprocessing on data received as output from the model 160. Additional details regarding using the AI model (e.g., model 160) are described below with reference to FIG. 4 and FIG. 5.

In some embodiments, an artificial intelligence (AI) model (also referred to as a "machine learning model" herein) can include a discriminative AI model (also referred to as a "discriminative machine learning model" herein), a generative AI model (also referred to as a "generative machine learning model" herein), and/or other AI model.

In some embodiments, a discriminative AI model can model a conditional probability of an output for given input(s). A discriminative AI model can learn the boundaries between different classes of data to make predictions on new data. In some embodiments, a discriminative AI model can include a classification model that is designed for classification tasks, such as learning decision boundaries between different classes of data and classifying input data into a particular classification. Examples of discriminative AI models include, but are not limited to, support vector machines (SVM) and neural networks.

In some embodiments, a generative AI model learns how the input training data is generated and can generate new data (e.g., original data). A generative AI model can model the probability distribution (e.g., joint probability distribution) of a dataset and generate new samples that often resemble the training data. Generative AI models can be used for tasks involving image generation, text generation, and/or data synthesis. Generative AI models include, but are not limited to, Gaussian mixture models (GMMs), variational autoencoders (VAEs), generative adversarial networks (GANs), large language models (LLMs), vision-language models (VLMs), or multi-modal models (e.g., text, images, video, audio, depth, or physiological signals).

Training of and inference using discriminative AI models is described herein. Server machine 130 includes a training set generator 131 that is capable of generating training data (e.g., a set of training inputs and a set of target outputs) to train a model 160 (e.g., a discriminative AI model). In some embodiments, training set generator 131 can generate the training data based on various data (e.g., stored at data store 106 or another data store connected to the system 100 via the network 104). The data store 106 can store metadata associated with the training data.

Server machine 140 includes a training engine 141 that is capable of training a model 160 using the training data from training set generator 131. The model 160 (also referred to as "machine learning model" or "artificial intelligence (AI) model" herein) may refer to the model artifact that is created by the training engine 141 using the training data that includes training inputs (e.g., features) and corresponding target outputs (correct answers for respective training inputs) (e.g., labels). The training engine 141 may find patterns in the training data that map the training input to the target output (the answer to be predicted) and provide the model 160 that captures these patterns. The model 160 may be composed of, e.g., a single level of linear or non-linear operations (e.g., a support vector machine (SVM)), or may be a deep network, i.e., an AI model that is composed of multiple levels of non-linear operations. An example of a deep network is a neural network with one or more hidden layers, and such an AI model may be trained by, for example, adjusting weights of a neural network in accordance with a backpropagation learning algorithm or the like. Model 160 can use one or more of a support vector machine (SVM), Radial Basis Function (RBF), clustering, supervised AI, semi-supervised AI, unsupervised AI, k-nearest neighbor algorithm (k-NN), linear regression, random forest, neural network (e.g., artificial neural network), or a boosted decision forest. For convenience rather than limitation, the remainder of this disclosure describing a discriminative AI model will refer to the implementation as a neural network, even though some implementations might employ another type of learning machine instead of, or in addition to, a neural network.

In some embodiments, such as with a supervised AI model, the one or more training inputs of the set of training inputs are paired with respective one or more training outputs of the set of training outputs. The training input-output pair(s) can be used as input to the AI model to help train the AI model to determine, for example, patterns in the data. The model parameters (e.g., values thereof) can be adjusted based on the training.

In some embodiments, training data, such as training input and/or training output, and/or input data to a trained AI model (collectively referred to as "AI model data" herein) can be preprocessed before providing the aforementioned data to the (trained or untrained) AI model (e.g., discriminative AI model and/or generative AI model) for execution. Preprocessing as applied to AI models (e.g., discriminative AI model and/or generative AI model) can refer to the preparation and/or transformation of AI model data.

In some embodiments, preprocessing can include data scaling. Data scaling can include a process of transforming numerical features in raw AI model data such that the preprocessed AI model data has a similar scale or range. For example, Min-Max scaling (Normalization) and/or Z-score normalization (Standardization) can be used to scale the raw AI model data. For instance, if the raw AI model data includes a feature representing temperatures in Fahrenheit, the raw AI model data can be scaled to a range of [0, 1] using Min-Max scaling.

In some embodiments, preprocessing can include data encoding. Encoding data can include a process of converting categorical or text data into a numerical format on which an AI model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by AI models. In some embodiments, embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by AI models.

In some embodiments, the training set is obtained from server machine 130. Server machine 150 includes a waste classification module 151 that provides current data (e.g., solid waste data) as input to the trained AI model (e.g., model 160) and runs the trained AI model (e.g., model 160) on the input to obtain one or more outputs.

In some embodiments, confidence data can include or indicate a level of confidence that a particular output (e.g., output(s)) corresponds to one or more inputs of the AI model (e.g., trained AI model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using an AI model.

In some embodiments, an AI model, such as model 160, may be (or may correspond to) one or more computer programs executed by processor(s) of server machine 140 and/or server machine 150. In other embodiments, an AI model may be (or may correspond to) one or more computer programs executed across a number or combination of server machines. For example, in some embodiments, AI models may be hosted on the cloud, while in other embodiments, these AI models may be hosted and perform operations using the hardware of a client device 111. In some embodiments, the AI models may be a self-hosted AI model, while in other embodiments, AI models may be external AI models accessed by an application programming interface (API).

In some embodiments, server machines 130 through 150 can be one or more computing devices (such as a rackmount server, a router computer, a server computer, a personal computer, a mainframe computer, a laptop computer, a tablet computer, or a desktop computer), data stores (e.g., hard disks, memories, databases), networks, software components, or hardware components that can be used to provide a user with access to one or more data items of the waste processing facility 120.

In some embodiments, one or more of server machine 130, server machine 140, model 160, server machine 150 can be part of the waste processing facility 120. In other embodiments, one or more of server machine 130, server machine 140, server machine 150, or model 160 can be separate from waste processing facility 120 (e.g., provided by a third-party service provider).

Also as noted above, for the purpose of illustration, rather than limitation, embodiments of the disclosure describe the training of an AI model (e.g., model 160) and use of a trained AI model (e.g., model 160). In other embodiments, a heuristic model or rule-based model can be used as an alternative. It should be noted that in some other embodiments, one or more of the functions of waste processing facility 120 can be provided by a greater number of machines. In addition, the functionality attributed to a particular component of the waste processing facility 120 can be performed by different or multiple components operating together.

In situations in which the systems discussed herein collect personal information about users, or utilize personal information, the users of client devices 111 can be provided with an opportunity to control whether or how the user information is collected. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the system 100.

Figure 2:
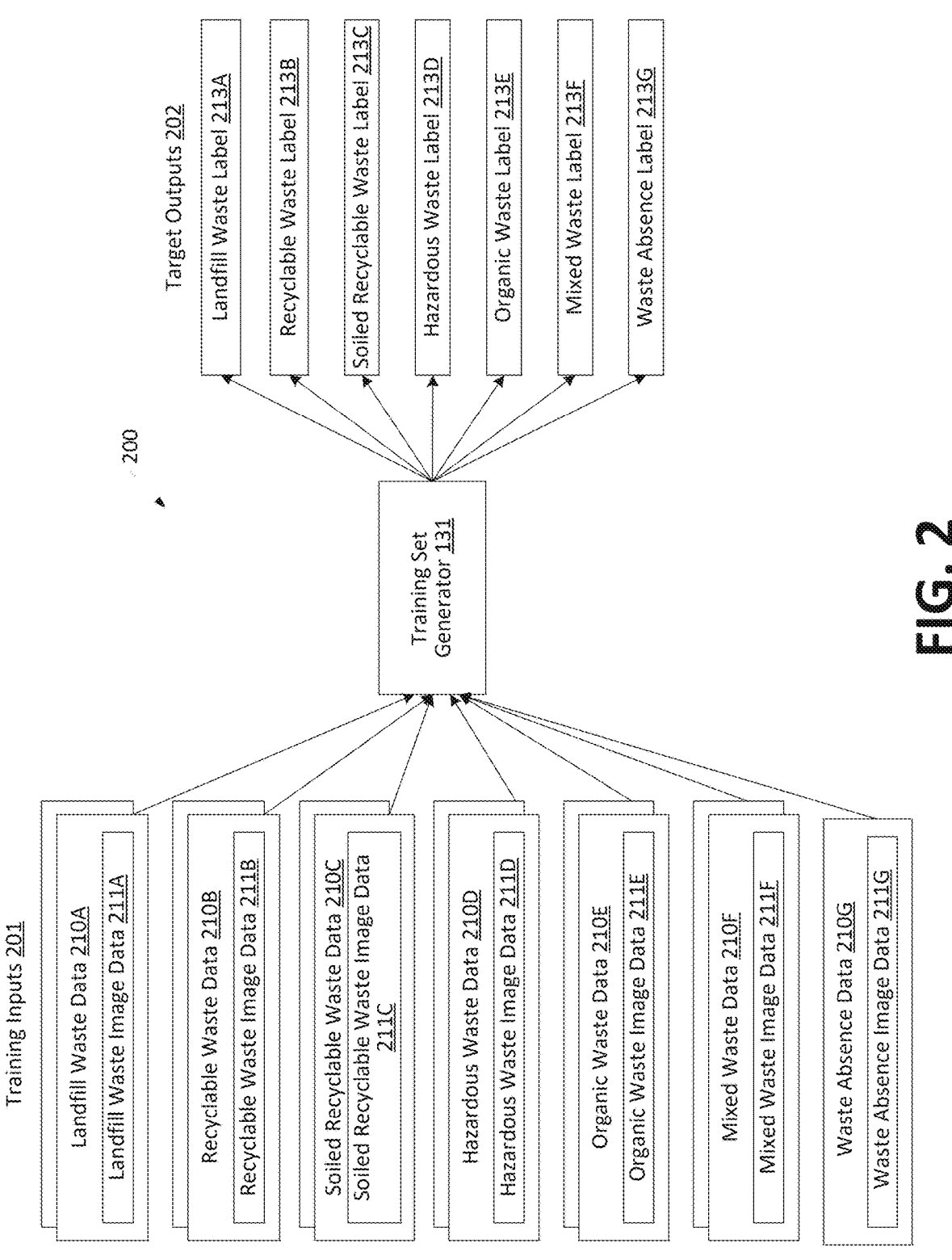
FIG. 2 is an example training set generator to create training data for an AI model using information pertaining to solid waste data and waste absence data, in accordance with embodiments of the disclosure.

FIG. 2 is an example training set generator to generate training data for an AI model using information pertaining to one or more of solid waste data and waste absence data, in accordance with embodiments of the disclosure. System 200 shows a training set generator 131, training inputs 201, and target outputs 202. System 200 can include similar components as the system 100, as described in FIG. 1. Components described with reference to the system 100 of FIG. 1 can be used to describe system 200 of FIG. 2.

In some embodiments, training set generator 131 generates training data that includes one or more training inputs 201 and one or more target outputs 202. The training data can include mapping data that maps the training inputs 201 to the target outputs 202. Training inputs 201 can also be referred to as "features" or "attributes" herein. In some embodiments, training set generator 131 can provide the training data in a training set, and provide the training set to the training engine 141 where it is used to train the model 160. Generating a training set is further described with reference to FIG. 3.

Training Inputs

Training inputs 210 can include one or more of solid waste data or waste absence data 210G. As described above, solid waste data can include landfill waste data 210A, recyclable waste data 210B, soiled recyclable waste data 210C, hazardous waste data 210D, organic waste data 210E, and/or mixed waste data 210F. Each of the solid waste data 210A through 210F and waste absence data 210G can include corresponding image data 211.

Solid waste data can include image data (e.g., image data 211A) of one or more images depicting one or more waste objects of a specific waste label (or multiple waste labels). Each waste label is described in further detail below. In some embodiments, images data represent one or more images. In some embodiments, image data can include images that are stored in a particular file format (e.g., joint photographic experts group (JPEG), or portable network graphics (PNG)). In some embodiments, the image stored in a particular file format can be pre-processed to generate image vectors that represent the one or more image vectors. In some embodiments, image data can include image vectors, or one-dimensional arrays where each element of the array contains a numerical value that represents the characteristics (e.g., the intensity or brightness) of a pixel in the image. As such, image vectors can encode information about the content of an image, including objects, shapes, patterns, and textures.

In some embodiments, image data can include image vectors representing a set of images depicting a waste object in different conditions (e.g., intact, deformed, soiled, fragmented, and/or compacted). For example, recyclable waste data can include a set of images depicting a plastic bottle that is intact, a compressed plastic bottle, a plastic bottle with soda residue, and a cracked plastic bottle. Depicting waste objects in different conditions can improve the ability of the model to identify common patterns and features (e.g., texture, color, or shape) of waste objects and correctly classify the waste objects based on identified features. In some embodiments, depicting waste objects in different conditions allows the model to identify when the condition of a waste object changes the waste label of the waste object. For example, recyclable waste data can include image data representing images of a plastic bottle with soda residue and soiled recyclable waste data can include image data representing images of a plastic bottle filled with soda, which trains the model to determine when a plastic bottle contains enough food residue to be labeled as soiled recyclable waste rather than recyclable waste (which also may change the waste stream in which the solid waste object is processed).

In other or similar embodiments, the image data can include image vectors representing a set of images depicting a waste object in different orientations. For example, recyclable waste data can include image data representing a set of images depicting a plastic water bottle that is upright, horizontal, inverted, or leaning diagonally against another waste object.

Waste absence data can also include image data 211G including image vectors. However, unlike solid waste data, the images represented by the image data 211G depict the environment of the waste processing facility absent waste objects. As no waste objects are depicted in the images, image data 211G does not include data on the condition or orientation of objects.

In some embodiments, one or more images can be generated by a physical camera (e.g., physical camera 123). In some embodiments, the physical camera can be located on a conveyor system 122 of a waste processing facility 120. In such embodiments, the physical camera may be maintained in a fixed position and/or fixed orientation relative to an environment of the waste processing facility 120. Position can refer to the location of the physical camera within the waste processing facility 120. Orientation can refer to the direction in which the physical camera is pointing (e.g., horizontal, vertical, tilted) and/or the position of the camera in physical space. For example, orientation can include yaw (pan), pitch (tilt) and/or roll. Yaw can include the rotation around a vertical axis, determining the left-right direction of the camera. Pitch can include the rotation around the horizontal axis, determining the up-down angle of the camera. Roll can include rotation around the longitudinal axis, determining how "level" the camera is with respect to the horizon. Yaw, pitch and roll can be described angles, which describe the orientation of the camera. For example, the physical camera can be positioned to the side of a conveyor in a conveyor system 122 and pointed towards the conveyor to capture the side profile of waste objects as they are carried on the conveyor in front of the physical camera, in some embodiments. In other embodiments, the camera may be positioned directly above a conveyor and pointed downwards at an angle to capture an overhead profile of the waste objects as they are carried underneath the physical camera. Image data may also be generated using a client device (e.g., client device 111), in some embodiments. For example, a user can capture an image of a waste object using a camera integrated into the client device. In some embodiments, multiple cameras can be implemented in a fixed position and/or orientation to capture different perspectives of the solid waste objects. In some embodiments, the physical camera can be moved (e.g., via control signals) to different positions and orientations.

Depending on the embodiment, the images may depict the same environment. The environment refers to the physical surroundings or setting in which an image is captured and can include one or more of the background, foreground, and middle ground depicted in an image. For example, in some embodiments, the conveyor system 122 may include a backdrop, such a blank wall or screen, where the physical camera 123 captures images of waste objects so that generated images have the same background. In other embodiments, where the physical camera 123 is positioned above a conveyor and captures an overhead profile of a waste object, the generated images depict the conveyor in the background.

In some embodiments, landfill waste data 210A includes corresponding landfill waste image data 211A. Landfill waste image data 211A can represent one or more images of landfill waste in one or more conditions and one or more orientations. In some embodiments, the landfill waste image data 211A can represent multiple images of landfill waste in multiple conditions and multiple orientations. Landfill waste can refer to waste objects that cannot be recycled, composted, or repurposed and/or are disposed of in a landfill, or a designated site where waste is buried and managed. Landfill waste can include, but is not limited to Styrofoam, some soiled recyclable materials, non-recyclable plastic (e.g., polystyrene), and diapers. In some embodiments, landfill waste may include mixed waste.

In some embodiments, recyclable waste data 210B includes corresponding recyclable waste image data 211B. Recyclable waste image data 211B can represent one or more images of recyclable waste in one or more conditions and one or more orientations. In some embodiments, the recyclable waste image data 211B can represent multiple images of recyclable waste in multiple conditions and multiple orientations. Recyclable waste can refer to waste objects that can be processed and reused to create new products. For example, plastic can be shredded to form plastic flakes, which can be melted into small pellets that are used as raw materials for new plastic products (e.g., plastic bottles). Recyclable waste can include, but is not limited to paper, cardboard, plastics, glass, and metals (e.g., aluminum).

In some embodiments, soiled recyclable waste data 210C includes corresponding soiled recyclable waste image data 211C. Soiled recyclable waste image data 211C can represent one or more images of soiled recyclable waste in one or more conditions and one or more orientations. In some embodiments, the soiled recyclable waste image data 211C can represent multiple images of soiled recyclable waste in multiple conditions and multiple orientations. Soiled recyclable waste can refer to recyclable waste that is contaminated with non-recyclable materials (e.g., oil or food) so as to be difficult to recycle effectively. Soiled recyclable waste can contaminate other recyclable waste in the waste stream, leading to a lower quality of recycled material. For example, grease on paper is difficult to remove and lowers the quality of recycled paper because the recycled product may contain the grease residue. Additionally, the non-recyclable materials can contaminate the machinery used to process recyclable materials, which can cause the machinery to stop functioning and/or increase the frequency of maintenance. For example, food residue such as syrup or sauces can leak onto conveyors or waste sorting components, causing waste objects to stick to the machinery and obstruct movement of waste objects. Soiled recyclable waste can include, but is not limited to paper, plastic, glass, or metal that contain food or beverage waste, greases, or oils.

In some embodiments, hazardous waste data 210D includes corresponding hazardous waste image data 211D. Hazardous waste image data 211D can represent one or more images of hazardous waste in one or more conditions and one or more orientations. In some embodiments, the hazardous waste image data 211D can represent multiple images of hazardous waste in multiple conditions and multiple orientations. Hazardous waste can refer to waste objects that are potentially harmful to human health or the environment due to characteristics including toxicity, flammability, corrosivity, or reactivity. Hazardous waste can include household hazardous waste. Due to the harmful characteristics of hazardous waste, leak-proof sealed storage and additional treatment to neutralize toxic, corrosive, or reactive materials may be used on waste objects of this type. For example, the lithium in lithium batteries is a highly reactive metal that can generate hydrogen gas and heat when exposed to air or water, resulting in fires or explosions. As such, lithium batteries may be immersed in a saltwater bath to discharge (drain of electrical energy), subject to thermal regulation to prevent overheating, and stored in fireproof containers before being processed for disposal or recycling. Hazardous waste can include, but is not limited to paints, cleaning products, batteries, pesticides, and electronics containing toxic substances (e.g., cadmium).

In some embodiments, organic waste data 210E includes corresponding organic waste image data 211E. Organic waste image data 211E can represent one or more images of organic waste in one or more conditions and one or more orientations. In some embodiments, the organic waste image data 211E can represent multiple images of organic waste in multiple conditions and multiple orientations. Organic waste can refer to waste objects made of biodegradable material, or material capable of decomposition by naturally occurring microorganisms (e.g., bacteria, fungi). For example, food waste such as apple cores can be composted using Windrow composting, where waste objects are piled into long rows that are periodically turned using machines to aerate the waste objects, to create nutrient rich soil. Organic waste can include, but is not limited to food waste, yard waste (e.g., grass clippings or leaves), and paper and cardboard that is uncontaminated by chemicals (e.g., paper towels).

In some embodiments, mixed waste data 210F includes corresponding mixed waste image data 211F. Mixed waste image data 211F can represent one or more images of mixed waste in one or more conditions and one or more orientations. In some embodiments, the mixed waste image data 211F can represent multiple images of mixed waste in multiple conditions and multiple orientations. Mixed waste can refer to waste objects that include multiple waste objects of different waste classifications. For example, food waste and napkins, which are organic or landfill waste, placed in aluminum cans or plastic bottles, which are recyclable waste, constitute mixed waste because waste objects of different waste classifications are combined in a single waste object. Depending on the embodiment, mixed waste can be disposed of (e.g., landfill waste) or subject to additional processing to separate the waste objects. Mixed waste can include, but is not limited to food waste in plastic bags, paper plates with food waste and plastic utensils, and plastic wrappers with food waste.

In some embodiments, waste absence data 210G includes corresponding waste absence image data 211G. Waste absence image data 211G can represent one or more images of the absence of waste objects. Waste absence refers to when the waste sorting system 125 does not contain waste objects for sorting.

In some embodiments, generating one or more training inputs can include sending one or more control signals to initiate a physical camera to capture images of solid waste objects. In some embodiments, the control signals can be used to capture each image. In other embodiments, the control signal can be used to start a video feed.

In some embodiments, generating the training inputs can include initiating a first control signal to slow a speed of a conveyor (e.g., conveyor belt) of a waste sorting system. In some embodiments, solid waste objects are transported on the conveyor and a physical camera is located to capture images of the solid waste objects transported on the conveyor. In some embodiments, concurrent with the speed of conveyor having slowed, another control signal is initiated to initiate the physical camera to capture one or more images of the solid waste on the slowed conveyor. In some embodiments, subsequent to initiating the control signal to cause the physical camera to capture the one or more images, another control signal can be initiated to increase the speed of the conveyor. In some embodiments, the above operations can be repeated for different objects. In some embodiments, the camera or other device can sense the presence of a solid waste object on the conveyor. An indication of the presence of the solid waste object can be received and used to trigger the initiation of the control signals.

In some embodiments, the training input can be generating using an original image, such as an original image of a solid waste object. The original image can be duplicated and modified to produce more images of the solid waste object. In some embodiments, the original image can be modified by changing the exposure of the original image. In some embodiments, the original image can be modified by saturating the original image. Exposure can include the amount of light in an image that determines the image's overall brightness. Saturation can include the intensity of the image's colors.

Target Outputs

Target outputs 202 can include one or more of solid waste labels (e.g., labels 213A-F) and/or a label indicating an absence of waste 213G. In some embodiments, one or more labels can be further subdivided into sub-labels or any level of sub-levels (e.g., sub-sub-level). A sub-level can correspond to a sub-classification. For example and in some embodiments, different sub-labels can each include metal, cloth, glass and/or plastic. Plastic sub-sub-labels can each include a different type of plastic such as different forms of polyethylene (e.g., low-density polyethylene (LDPE), high-density polyethylene (HDPE), liner low-density polyethylene (LLDPE), polypropylene (PP), polyvinyl chloride (PVC), Polyethylene Terephthalate (PET), and/or Polystyrene (PS).

In some embodiments, landfill waste labels 213A can include an indication (e.g., label) that identifies solid waste objects depicted in image data (e.g., landfill waste image data 211A) as landfill waste. In some embodiments landfill waste image data 211A can be mapped to landfill waste labels 213A (e.g., particular training inputs 201 can be paired with particular training outputs 202).

In some embodiments, recyclable waste labels 213B can include an indication (e.g., label) that identifies solid waste objects depicted in image data (e.g., recyclable waste image data 211B) as recyclable waste. In some embodiments, recyclable waste image data 211B can be mapped to recyclable waste labels 213B (e.g., particular training inputs 201 can be paired with particular training outputs 202).

In some embodiments, soiled recyclable waste labels 213C can include an indication (e.g., label) that identifies solid waste objects depicted in image data (e.g., soiled recyclable waste image data 211C) as soiled recyclable waste. In some embodiments, soiled recyclable waste image data 211C can be mapped to soiled recyclable waste labels 213C (e.g., particular training inputs 201 can be paired with particular training outputs 202).

In some embodiments, hazardous waste labels 213D can include an indication (e.g., label) that identifies solid waste objects depicted in image data (e.g., hazardous waste image data 211D) as hazardous waste. In some embodiments, hazardous waste image data 211D can be mapped to hazardous waste labels 213D (e.g., particular training inputs 201 can be paired with particular training outputs 202).

In some embodiments, organic waste 213E labels can include an indication (e.g., label) that identifies solid waste objects depicted in image data (e.g., organic waste image data 211E) as organic waste. In some embodiments, organic waste image data 211E can be mapped to organic waste labels 213E (e.g., particular training inputs 201 can be paired with particular training outputs 202).

In some embodiments, mixed waste 213F labels can include an indication (e.g., label) that identifies solid waste objects depicted in image data (e.g., mixed waste image data 211F) as mixed waste. In some embodiments, mixed waste image data 211F can be mapped to mixed waste labels 213F (e.g., particular training inputs 201 can be paired with particular training outputs 202).

In some embodiments, waste absence labels 213G can include an indication (e.g., label) that identifies an absence of solid waste objects depicted in image data (e.g., waste absence image data 211G). In some embodiments, waste absence image data 211G can be mapped to waste absence labels 213G (e.g., particular training inputs 201 can be paired with particular training outputs 202).

In some embodiments, subsequent to or based on generating a training set and training the model 160 using the training set, the model 160 can be further trained (e.g., additional data for a training set) or adjusted (e.g., adjusting weights associated with input data of the model 160, such as connection weights in a neural network). In some embodiments, the model 160 can be trained on additional training inputs (not illustrated) and additional target outputs (not illustrated).

FIG. 3A depicts a flow diagram of one example of a method 300 for training an AI model to classify waste objects or an absence of waste objects, in accordance with embodiments of the disclosure. The method is performed by processing logic that can include hardware (circuitry or dedicated logic), software (e.g., instructions run on a processing device), or a combination thereof. In one embodiment, some or all the operations of method 300 can be performed by one or more components of system 100 of FIG. 1. In other embodiments, one or more operations of method 300 can be performed by training set generator 131 of server machine 130 as described with reference to FIG. 1 through FIG. 2. In some embodiments, one or more operations of method 300 can be performed by waste classification module 151. It can be noted that components described with respect to FIG. 1 through FIG. 2 can be used to help illustrate aspects of FIG. 3A. In some embodiments, the operations (e.g., operations 301-311) can be the same, different, fewer, or greater. For instance, in some embodiments one or more training inputs can be generated or one or more target outputs can be generated, and the one or more training inputs and one or more training outputs can be used as input-output pairs (for input) to train the AI model, such as model 160, to be used by the waste classification module 151.

Method 300 generates training data for an AI model. In some embodiments, at operation 301, processing logic implementing the method 300 initializes the training set "T" to an empty set (e.g., "{ }").

At operation 302, the processing logic generates, using a physical camera (e.g., physical camera 123, one or more first images of a first waste object and second images of a second waste object. In some embodiments, the physical camera 123 can be maintained at a fixed position and orientation relative to an environment of a waste processing facility (e.g., waste processing facility 120). In some embodiments, the client device 111 may generate the one or more images (e.g., a user captures an image using a camera on a cellular device). In some embodiments, the environment represented in the first and second images is the same (e.g., the first and second images depict the conveyor system 122 of the waste processing facility). In some embodiments, the images can be pre-processed to generate image vector data representing the images.

At operation 303, the processing logic generates a first training input including first data (e.g., first image data) representing the first images depicting the first waste (e.g., multiple waste objects of a particular type or classification). In some embodiments, the first data can include image vectors representing the first images. In some embodiments, the first images may include images of the first waste in different conditions (e.g., intact, deformed, or soiled) and/or orientations relative to the environment (e.g., upright or horizontal).

At operation 304, the processing logic generates a second training input including second data representing the second images depicting the second waste (e.g., multiple waste objects of a particular type or classification). Similar to the first training input, the second training input can include image vectors representing the second images and the second images may depict the second waste in different conditions and/or orientations.

At operation 305, the processing logic generates a first target output for the first training input. The first target output identifies a waste label corresponding to landfill waste.

At operation 306, the processing logic generates a second target output for the second training input. The second target output identifies a waste label corresponding to recyclable waste.

In some embodiments, the processing logic can generate additional training data for additional waste categories or types at operation 307, as described in FIG. 3B.

At operation 308, processing logic optionally generates mapping data that is indicative of an input/output mapping. The input/output mapping (or training set mapping data) can refer to the training input (e.g., one or more of the training inputs described herein), the set of target outputs for the training input (e.g., one or more of the target outputs described herein), and an association between the training input(s) and the target output(s).

At operation 309, processing logic adds the mapping data generated at operation 308 to the training set T.

At operation 310, processing logic branches are based on whether training set T is sufficient for training the model 160. If so, execution proceeds to operation 311, otherwise, execution continues back at operation 302. It should be noted that in some embodiments, the sufficiency of training set T may be determined based simply on the number of input/output mappings in the training set, while in some other embodiments, the sufficiency of training set T may be determined based on one or more other criteria (e.g., a measure of diversity of the training examples, or accuracy satisfying a threshold) in addition to, or instead of, the number of input/output mappings.

At operation 311, processing logic provides training set T to train the AI model (e.g., model 160). In one embodiment, training set T is provided to training engine 141 of server machine 140 to perform the training. In some embodiments, operation 309 can include training the AI model using the training set T. In the case of a neural network, for example, input values of a given input/output mapping (e.g., numerical values associated with training inputs 201) are input to the neural network, and output values (e.g., numerical values associated with target outputs 202) of the input/output mapping are stored in the output nodes of the neural network. The connection weights in the neural network are then adjusted in accordance with a learning algorithm (e.g., back propagation), and the procedure is repeated for the other input/output mappings in training set T. At operation 309, the AI model (e.g., model 160) can be trained using training engine 141 of server machine 140. The trained AI model (e.g., model 160) can be implemented by the waste classification module 151 (of server machine 150) to identify a waste classification for a waste object.

FIG. 3B depicts a flow diagram of one example of a sub-method 320 for training an AI model to classify waste objects or an absence of waste objects, in accordance with embodiments of the disclosure. The sub-method is performed by processing logic that can include hardware (circuitry or dedicated logic), software (e.g., instructions run on a processing device), or a combination thereof. In one embodiment, some or all the operations of sub-method 320 can be performed by one or more components of system 100 of FIG. 1. In other embodiments, one or more operations of sub-method 320 can be performed by training set generator 131 of server machine 130 as described with reference to FIG. 1 through FIG. 2. In some embodiments, one or more operations of sub-method 320 can be performed by waste classification module 151. It can be noted that components described with respect to FIG. 1 through FIG. 2 can be used to help illustrate aspects of FIG. 3B. In some embodiments, the operations (e.g., operations 321-330) can be the same, different, fewer, or greater.

In some embodiments, the generated training inputs can include images generated using the physical camera 123 or client device 111, as described in operation 302 in FIG. 3A. As described above, training inputs including data representing images depicting waste objects can include image vectors and depict the waste object in different conditions and/or orientations.

At operation 321, the processing logic generates a third training input including third data representing an environment represented in at least one of the first images or second images. In some embodiments, the environment is absent solid waste. For example, if the environment represented in the first and second images is an overhead view of a conveyor, the third training input can depict the conveyor absent any waste objects.

At operation 322, the processing logic generates a fourth training input including fourth data representing fourth images depicting a fourth waste (e.g., multiple objects of a particular type or classification).

At operation 323, the processing logic generates a fifth training input including fifth data representing fifth images depicting a fifth waste (e.g., multiple waste objects of a particular type or classification).

At operation 324, the processing logic generates a sixth training input including sixth data representing sixth images depicting a sixth waste (e.g., multiple waste objects of a particular type or classification).

At operation 325, the processing logic generates a seventh training input including seventh data representing seventh images depicting a seventh waste (e.g., multiple waste objects of a particular type or classification).

At operation 326, the processing logic generates a third target output for the third training input. In some embodiments, the third target output identifies a waste label corresponding to an absence of a waste object in the environment.

At operation 327, the processing logic generates a fourth target output for the fourth training input. In some embodiments, the fourth target output identifies a waste label corresponding to organic waste.

At operation 328, the processing logic generates a fifth target output for the fifth training input. In some embodiments, the fifth target output identifies a waste label corresponding to hazardous waste.

At operation 329, the processing logic generates a sixth target output for the sixth training input. In some embodiments, the sixth target output identifies a waste label corresponding to mixed waste.

At operation 330, the processing logic generates a seventh target output for the seventh training input. In some embodiments, the seventh target output identifies a waste label corresponding to soiled recyclable waste.

As noted herein and in some embodiments, processing logic can generate subclassification of some types of solid waste, such as recyclable solid waste.

As described above, the sub-method 320 can be included in method 300, and the training data generated in operations 321-330 can be included in the mapping data generated at operation 308.

Figure 4:
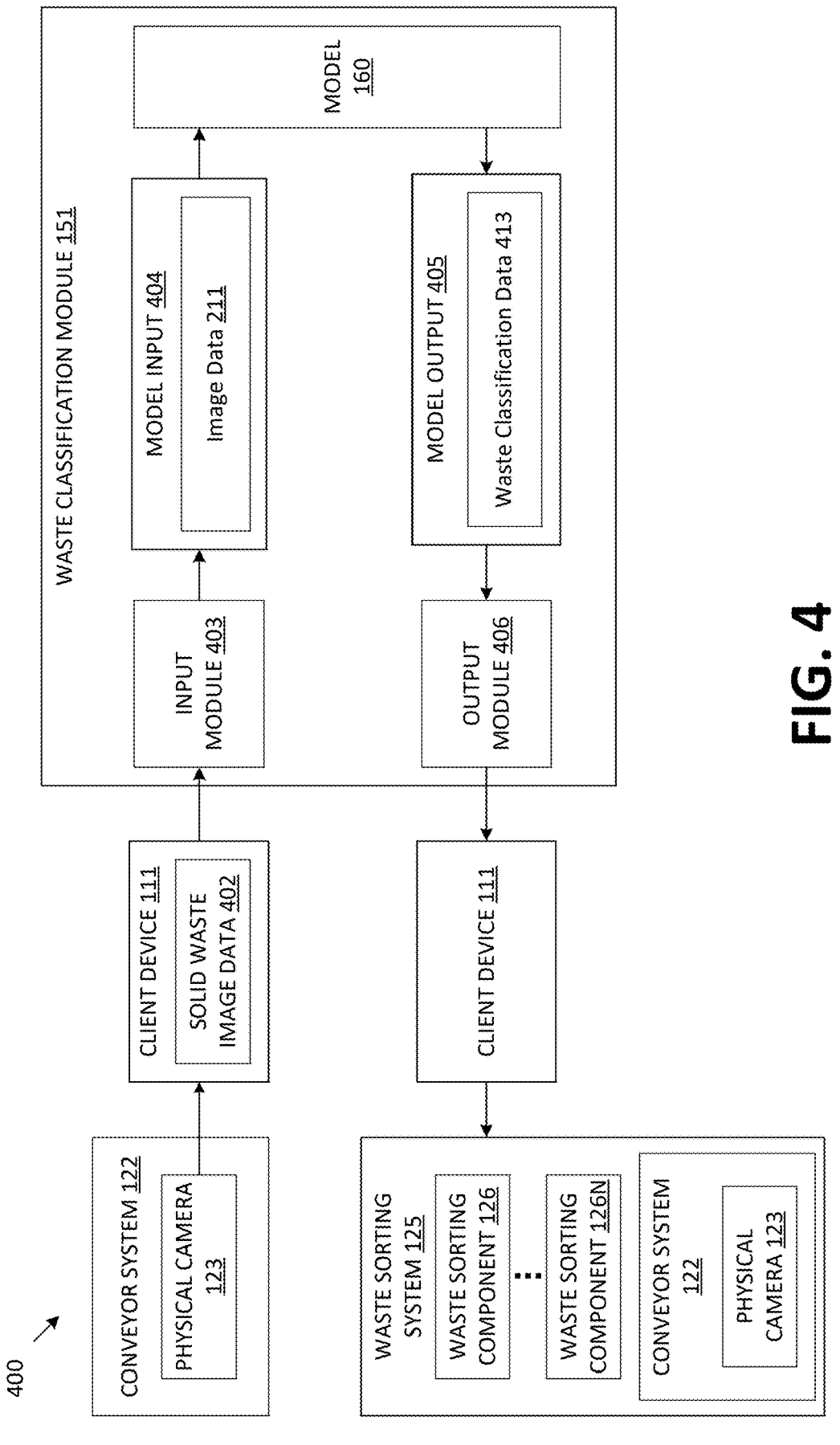
FIG. 4 is an example system flow for using a trained AI model to identify a waste classification for a solid waste object, in accordance with embodiments of the disclosure.

FIG. 4 is an example method for using a trained AI model to identify waste classification for a waste object depicted in an image and sort the waste object based on the classification, in accordance with embodiments of the disclosure. In some embodiments, some, or all of the operations of method 400 can be performed by one or more components of system 100 of FIG. 1, such as the waste classification module 151. It can be noted that components described with reference to FIG. 1 can be used to illustrate aspects of FIG. 4. Although method 400 is illustrated with a particular order, it can be appreciated that some of the operations can be performed serially or in parallel. In some embodiments, the operations can be the same, different, fewer, or greater. The method 400 illustrates using a trained AI model to identify model output 405 based on a model input 404.

In some embodiments, a physical camera 123 included in a conveyor system 122 of a waste processing facility 120 can generate one or more images of a waste object on a conveyor in the conveyor system 122. In some embodiments, the physical camera 123 can be maintained in a fixed position and orientation relative to the waste processing facility 120, as described in reference to FIG. 2. In other embodiments, a client device 111 can be used to generate the one or more images of a waste object (e.g., capturing an image using a camera attached to the client device 111). Depending on the embodiment, the one or more images can depict the same environment (e.g., a backdrop). The solid waste image data 402 is transmitted to the waste classification module 151 by a client device 111. In some embodiments, the client device 111 can be included in the waste processing facility 120. In other embodiments, the client device 111 can be separate from the waste processing facility 120. The waste classification module 151 can be located on the client device 111, in some embodiments. In other embodiments, the waste classification module 151 can be located on a separate server (e.g., server 150) that is accessible to the client device 111.

The waste classification module 151 can provide the obtained solid waste image data 402 to an input module 403 for preprocessing. In some embodiments, preprocessing can include one or more of flattening an image, or converting a two-dimensional matrix of pixel values representing the image into a one-dimensional vector that represents pixel values of the image (e.g., image vector data). In other or similar embodiments, preprocessing can include processing the image through convolutional layers of a convolutional neural network (CNN), which detects features (e.g., edges, corners) depicted in the image and combines the features into complex patterns in deeper layers to generate a feature map of the image. The feature map is then flattened into a one-dimensional vector (e.g., image vector data). The pre-processed image data 211 is included in the model input 404.

The waste classification module 151 provides the model input 404 to the model 160 (e.g., trained AI model) to generate output data (e.g., model output 405). The model output 405 can include waste classification data 413 indicating a solid waste classification (e.g., landfill waste or recyclable waste) for a waste object depicted in the generated image(s), in some embodiments. In some embodiments, the waste classification data 413 can include multiple solid waste classifications corresponding to multiple waste objects depicted in the generated image(s). For example, the model 160 can generate two waste classifications for images depicting mixed waste including a plastic bag filled with food waste: a landfill classification for the plastic bag and an organic waste classification for the food waste. In other embodiments, the waste classification data 413 may indicate an absence of waste objects in the generated image(s). The model output 405 can also include a level of confidence that each indicated waste classification corresponds to the waste object, or absence of waste objects, depicted in the generated image(s).

The waste classification module 151 can provide the model output 405 to an output module 406, which processes the output to determine a waste processing operation to perform based on the model output 405. In some embodiments, the output module 406 can determine whether each level of confidence for each waste classification in the model output 405 satisfies a threshold level of confidence. If a waste classification is determined to have a level of confidence that satisfies the threshold level of confidence, the waste classification module 151 can send, via the client device 111, one or more control signals that instruct a waste sorting system 125 to move the waste object to a specific waste stream that corresponds to the waste classification. If a waste absence classification is determined to have a level of confidence that satisfies the threshold level of confidence, the waste classification module 151 can refrain from sending control signals that instruct the waste sorting system 125 to move a waste object. In some embodiments, satisfying the threshold level of confidence can also cause a notification to be sent to client device 111. The notification can identify the waste classification data 413 for the waste object or absence of waste objects.

Upon receiving one or more control signals from the waste classification module 151 and/or client device 111, the waste sorting system 125 can control one or more waste sorting components 126 to move the waste object to a waste stream that corresponds to the waste classification. For example, a waste sorting component 126 can be a rotary device upon which multiple waste disposal containers, each storing waste of different types, are attached. Upon receiving a control signal, the waste sorting system 125 can control the rotary device to rotate to a predefined position that aligns a waste disposal container corresponding to the waste classification of the waste object in a position to capture the waste object (e.g., aligning a container for recyclable waste with the end of a conveyor to catch recyclable waste that reaches the end of the conveyor). Sorting components 126 can include one or more of grabber claws, rams, blowers, magnets, conveyors, and/or rotary devices. In some embodiments, a sensor can sense whether an amount of waste contained in a waste disposal container exceeds a threshold amount (e.g., sense if the container is full). The sensor can send an indication that a particular waste disposal container contains a threshold amount of waste. Responsive to receiving the indication, the system can initiate control signals that cause the disposal container to empty. For example, the container can empty on a conveyor or another part of the waste disposal system and/or enable movement of the contents of the container along the specific waste stream.

It can be noted that aspects of the present disclosure can be applied to different implementations. For example, and in some embodiments, the trained AI model can be implemented on and/or accessible via a mobile device. The mobile device can take a picture of a solid waste object. Image data representing the image can be sent to the waste classification module 151 for classification. Subsequent to classification, the graphical user interface (GUI) can display the classification of the solid waste object. For example, the mobile device can take a picture of an aluminum can, perform the classification, and provide a notification that the aluminum can is recyclable. The notification can inform the user that the solid waste object can be placed in a recycling container.

Similarly, and in some embodiments, the mobile device (or other user device) can be used by a user of waste processing facility to generate training data to retrain or fine-tune the AI model. For example, the user captures images of solid waste objects. The solid waste objects can be classified via the waste classification module 151. The determined classification can be displayed via the mobile device and the user can either confirm the classification or reject the classification and/or provide the appropriate classification. The image data and confirmed/denied/corrected classification can be used as input to retrain the AI model.

In some embodiments, the waste classification module 151 can be implemented with waste receptacle. Solid waste can be placed in the waste receptacle. A physical camera of the waste receptacle can generate an image of the solid waste object(s) and classify the represented solid waste object(s). Responsive to the determined classification, the waste receptacle can move or filter the solid waste object in the appropriate sub-waste container based on the classification.

Figure 5:
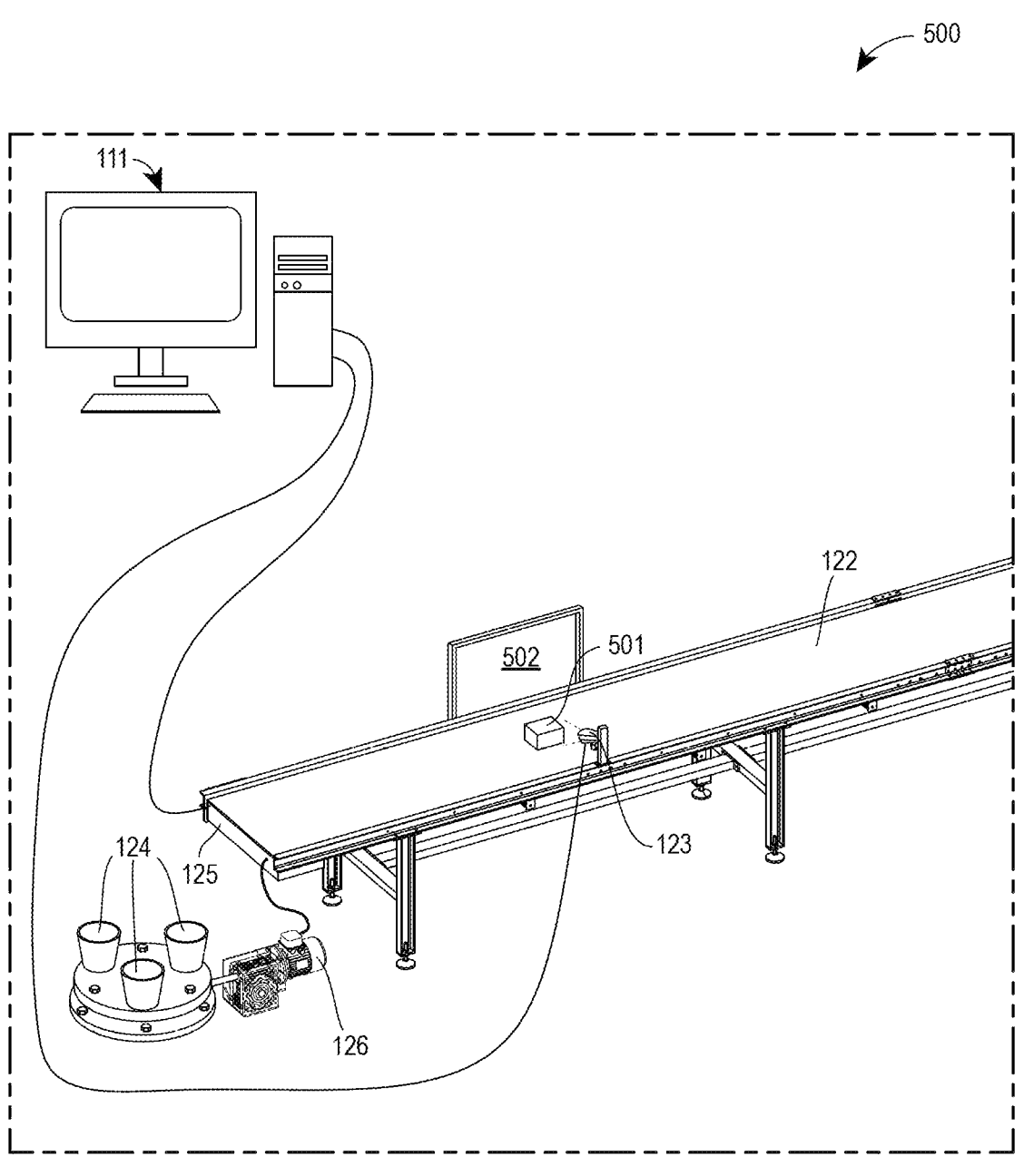
FIG. 5 illustrates an example architecture of a system for identifying and sorting solid waste objects, in accordance with embodiments of the present disclosure.

FIG. 5 depicts an example architecture 500 of one embodiment of a system for identifying and sorting solid waste objects, according to embodiments of the present disclosure. According to the embodiment, a waste object 501 is transported on a conveyor system 122 to be sorted into a waste stream 124 according to a determined waste classification. The conveyor system 122 includes a physical camera 123 that is maintained at a fixed position, orientation and angle relative to the conveyor system 122. The physical camera 123 can capture one or more images of the waste object 501 as it is carried by the conveyor system 122 in front of the physical camera 123. The architecture 500 also includes a backdrop 502, which serves as the background for images captured by physical camera 123, ensuring that generated images depict the same environment.

The image generated by physical camera 123 is transmitted to client device 111, which hosts a waste classification module (e.g., waste classification module 151). The client device 111 can provide the generated image to the waste classification module, which provides the image to an AI model (e.g., model 160) to identify a waste classification for the waste object 501. In some embodiments, the waste classification module can preprocess the image before providing it as input to the AI model. The waste classification module receives one or more outputs of the AI model, including a waste classification and a level of confidence that the waste classification corresponds to the waste object 501. The waste classification module can determine whether the level of confidence satisfies a threshold level of confidence. If the threshold level of confidence is satisfied, the waste classification module will transmit one or more control signals to a waste sorting system 125, via the client device 111.

Waste sorting system 125 includes a circuit board including one or more microcontrollers and a rotary device with waste disposal containers corresponding to different waste streams 126 attached as the waste sorting component 126. Upon receiving the one or more control signals, a microcontroller in the circuit board can rotate the rotary device (such as a servo motor) so that the waste disposal container corresponding to the waste classification of the waste object 501 is positioned at the end of the conveyor system 122. As such, the waste object 501 is transported by the conveyor system 122 into the waste disposal container corresponding to a waste stream 124 based on the waste classification.

A servo motor can refer to an electromechanical device that includes a motor to provide controlled motion in response to a control signal. In some embodiments, a feedback mechanism can generate information corresponding to at least one of position, velocity, or torque of the motor output, and the control system, such as a microcontroller, adjusts the motor operation based on the feedback to achieve a commanded state. In some embodiments, the servo motor may be embodied as a rotary or linear actuator and may utilize direct current (DC) or alternating current (AC) drive sources. A microcontroller can refer to an integrated circuit device that includes at least one processor core, memory, and input/output interfaces, configured to execute programmed instructions for controlling one or more electronic or electromechanical systems, such as a servo motor. In some embodiments, the microcontroller can be programmed by a user with one or more instructions. In some embodiments, microcontroller may include non-volatile memory for storing firmware, volatile memory for temporary data, and peripheral modules such as timers, communication ports, and analog-to-digital or digital-to-analog converters. The microcontroller may be operable to receive sensor signals, process data, and generate control outputs in accordance with predetermined logic or software instructions.

FIG. 6A depicts a flow diagram of one example method 600 for identifying a waste classification for a waste object, in accordance with embodiments of the disclosure. The method 600 is performed by processing logic that can include hardware (circuitry or dedicated logic), software (e.g., instructions run on a processing device), or a combination thereof. In one embodiment, some or all the operations of method 600 can be performed by one or more components of system 100 of FIG. 1, such as the waste classification module 151. It can be noted that components described with reference to FIG. 1 can be used to illustrate aspects of FIG. 6A. In some embodiments, the operations (e.g., operations 601-605) can be the same, different, fewer, or greater.

At operation 601, processing logic generates, using a physical camera (e.g., physical camera 123) one or more first images of a first waste object in an environment of a waste processing facility. In some embodiments, the physical camera 123 is maintained at a fixed position and orientation relative to an environment of the waste processing facility 120. In other embodiments, the one or more images can be generated using a physical camera on a client device 111.

At operation 602, processing logic provides, to a trained AI model (e.g., model 160) a first input including first data representing the one or more first images of the first waste object in the environment of the waste processing facility. The first data may include image data (e.g., image vectors) representing the one or more first images.

At operation 603, processing logic obtains, from the trained AI model, one or more outputs identifying a first waste classification (e.g., landfill, recyclable, hazardous, or organic) for the first waste object and a first level of confidence that the first waste classification corresponds to the first waste object.

At operation 604, processing logic determines whether the first level of confidence satisfies a threshold level of confidence. If the first level of confidence does not satisfy the threshold level of confidence, processing logic proceeds to operation 601. If the first level of confidence satisfies the threshold level of confidence, processing logic proceeds to operation 605.

At operation 605, processing logic sends one or more first control signals that instruct a waste sorting system (e.g., waste sorting system 125) to move the first waste object to a specific waste stream (e.g., waste stream 124) corresponding to the first waste classification.

FIG. 6B depicts a flow diagram of one example method 610 for identifying a waste classification for mixed solid waste, in accordance with embodiments of the disclosure. The method 610 is performed by processing logic that can include hardware (circuitry or dedicated logic), software (e.g., instructions run on a processing device), or a combination thereof. In one embodiment, some or all the operations of method 610 can be performed by one or more components of system 100 of FIG. 1, such as the waste classification module 151. It can be noted that components described with reference to FIG. 1 can be used to illustrate aspects of FIG. 6B. In some embodiments, the operations (e.g., operations 611-615) can be the same, different, fewer, or greater.

At operation 611, processing logic generates, using a physical camera (e.g., physical camera 123) one or more second images of a mixed solid waste in an environment of a waste processing facility. Depending on the embodiments, the physical camera can be maintained at a fixed position and/or orientation relative to the waste processing facility 120. In other embodiments, the one or more second images can be generated by a camera on a client device 111.

At operation 612, processing logic provides, to a trained AI model (e.g., model 160) a second input including second data representing one or more second images of the mixed solid waste in the environment of the waste processing facility.

At operation 613, processing logic obtains, from the trained AI model, one or more outputs identifying (i) a second waste classification of a second waste object included in the mixed solid waste, (ii) a second level of confidence that the second waste classification corresponds to the second waste object, (iii) a third waste classification of a third waste object included in the mixed solid waste, and (iv) a third level of confidence that the third waste classification corresponds to the third waste object.

At operation 614, processing logic determines whether the second level of confidence and third level of confidence each satisfy a threshold level of confidence. If either level of confidence does not satisfy the threshold level of confidence, processing logic proceeds to operation 611. If both levels of confidence each satisfy the threshold level of confidence, processing logic proceeds to operation 615.

At operation 615, processing logic sends one or more second control signals that instruct a waste sorting system (e.g., waste sorting system 125) to move the mixed solid waste to a specific waste stream (e.g., waste stream 124) corresponding to a mixed waste classification. In some embodiments, mixed waste can be subject to further processing to separate the waste objects. In other embodiments, the mixed waste object may be disposed of (e.g., placed in a landfill).

FIG. 6C depicts a flow diagram of one example method 620 for identifying a waste classification for an absence of waste, in accordance with embodiments of the disclosure. The method 620 is performed by processing logic that can include hardware (circuitry or dedicated logic), software (e.g., instructions run on a processing device), or a combination thereof. In one embodiment, some or all the operations of method 620 can be performed by one or more components of system 100 of FIG. 1, such as the waste classification module 151. It can be noted that components described with reference to FIG. 1 can be used to illustrate aspects of FIG. 6C. In some embodiments, the operations (e.g., operations 621-625) can be the same, different, fewer, or greater.

At operation 621, processing logic generates, using a physical camera (e.g., physical camera 123) one or more third images of an environment of a waste processing facility (e.g., waste processing facility 120).

At operation 622, processing logic provides, to a trained AI model (e.g., model 160) a third input including third data representing one or more third images of the environment of the waste processing facility absent waste.

At operation 623, processing logic obtains, from the trained AI model, one or more outputs identifying a fourth waste classification of an absence of solid waste and a fourth level of confidence that the fourth waste classification corresponds to an absence of solid waste. It can be noted that in some embodiments, the outputs can identify any waste classification (e.g., household hazardous waste) as described herein.

At operation 624, processing logic determines whether the fourth level of confidence satisfies a threshold level of confidence. If the fourth level of confidence does not satisfy the threshold level of confidence, processing logic proceeds to operation 621. If the fourth level of confidence satisfies the threshold level of confidence, processing logic proceeds to operation 625.

At operation 625, processing logic refrains from sending one or more control signals that instruct a waste sorting system (e.g., waste sorting system 125) to move a waste object to a specific waste stream (e.g., waste stream 124).

Figure 7:
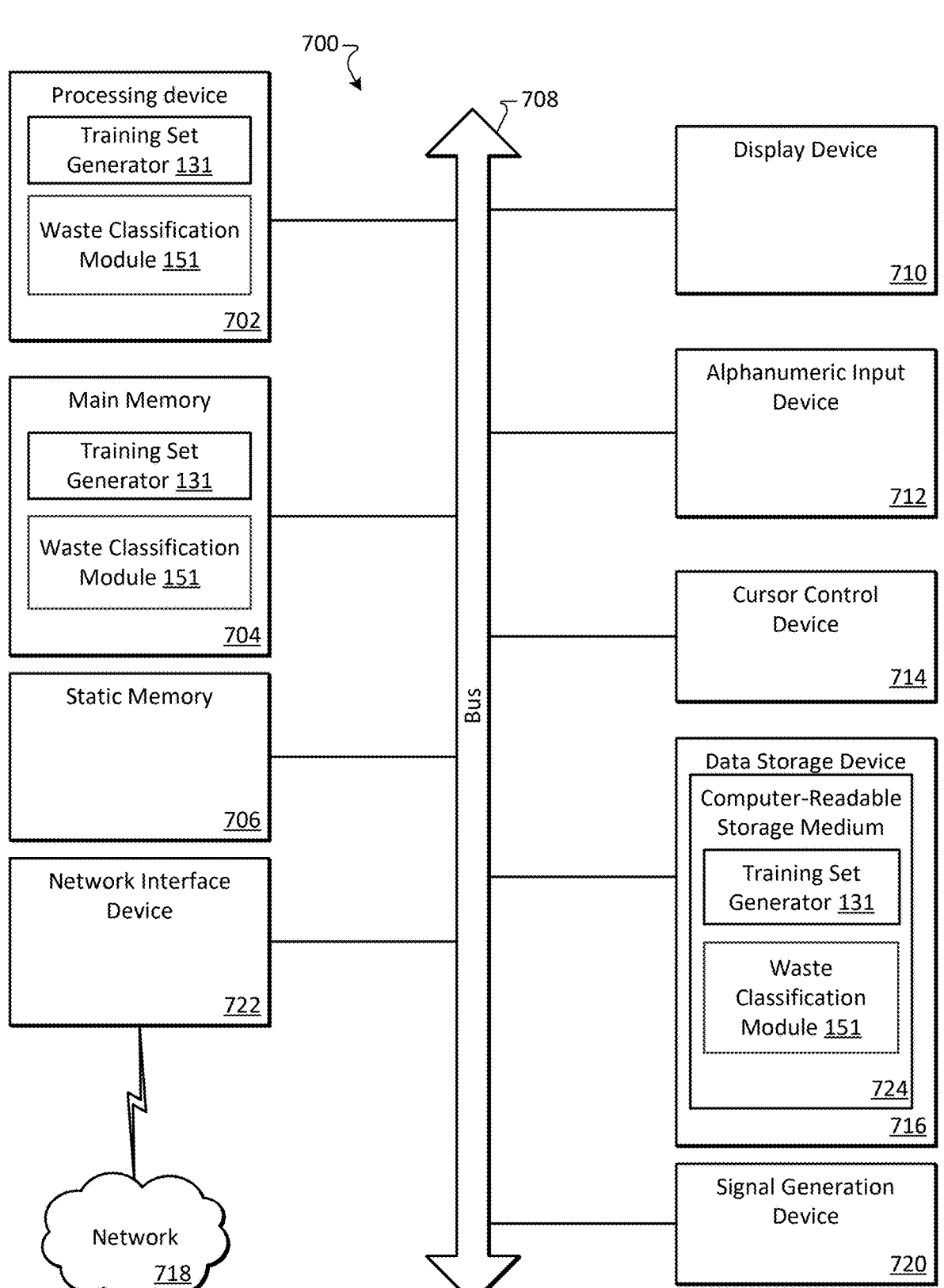
FIG. 7 is a block diagram illustrating an exemplary computer system, in accordance with embodiments of the disclosure.

FIG. 7 is a block diagram illustrating an exemplary computer system, system 700, in accordance with embodiments of the disclosure. The system 700 executes one or more sets of instructions that cause the machine to perform any one or more of the methodologies discussed herein. Set of instructions, instructions, and the like can refer to instructions that, when executed by system 700, cause the system 700 to perform one or more operations of training set generator 131 or the waste classification module 151. The machine can operate in the capacity of a server or a client device in a client-server network environment, or as a peer machine in a peer-to-peer (or distributed) network environment. The machine can be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The system 700 includes a processing device 702, a main memory 704 (e.g., read-only memory (ROM), flash memory, dynamic random access memory (DRAM) such as synchronous DRAM (SDRAM) or Rambus DRAM (RDRAM)), a static memory 706 (e.g., flash memory or static random access memory (SRAM)), and a data storage device 716, which communicate with each other via a bus 708.

The processing device 702 represents one or more general-purpose processing devices such as a microprocessor, central processing unit, or the like. More particularly, the processing device 702 can be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions of the system 100.

The system 700 can further include a network interface device 722 that provides communication with other machines over a network 718, such as a local area network (LAN), an intranet, an extranet, or the Internet. The system 700 also can include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 can include a computer-readable storage medium 724 on which is stored the sets of instructions of the system 100 and of training set generator 131 or of the waste classification module 151 embodying any one or more of the methodologies or functions described herein. The computer-readable storage medium 724 can be a non-transitory computer-readable storage medium. The sets of instructions of the system 100 and of training set generator 131 or of the waste classification module 151 can also reside, completely or at least partially, within the main memory 704 and/or within the processing device 702 during execution thereof by the system 700, the main memory 704 and the processing device 702 also constituting computer-readable storage media. The sets of instructions can further be transmitted or received over the network 718 via the network interface device 722.

While the example of the computer-readable storage medium 724 is shown as a single medium, the term "com-puter-readable storage medium" can include a single medium or multiple media (e.g., a centralized or distributed database, and/or associated caches and servers) that store the sets of instructions. The term "computer-readable storage medium" can include any medium that is capable of storing, encoding, or carrying a set of instructions for execution by the machine and that cause the machine to perform any one or more of the methodologies of the disclosure. The term "computer-readable storage medium" can include, but not be limited to, solid-state memories, optical media, and magnetic media. For example, the term "computer-readable storage medium" can include a non-transitory computer-readable storage medium.

In the foregoing description, numerous details are set forth. It will be apparent, however, to one of ordinary skill in the art having the benefit of this disclosure, that the disclosure can be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It can be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating," "providing," "obtaining," "identifying," "determining," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus can be specially constructed for the required purposes, or it can include a general purpose computer selectively activated or reconfigured by a computer program stored in the computer. Such a computer program can be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and cannot necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure can, therefore, be determined with reference to the appended claims, along with the full scope of equivalents to which such claims are entitled.

What is claimed is:

1. A method comprising:
  generating training data for an artificial intelligence (AI) model using information pertaining to characteristics of solid waste (SW), wherein generating the training data comprises:
    generating a first training input, the first training input comprising first data representing first images of a first solid waste;
    storing the first training input in a data store;
    generating a second training input, the second training input comprising second data representing second images of a second solid waste;

storing the second training input in the data store;
    generating a first target output for the first training input, wherein the first target output identifies, for the first solid waste represented in the first images, a first waste label, among a plurality of waste labels, corresponding to landfill waste;
    generating a second target output for the second training input, wherein the second target output identifies, for the second solid waste represented in the second images, a second waste label, among the plurality of waste labels, corresponding to recyclable waste;
    generating a third training input, the third training input comprising third data representing third images of a third solid waste;
    generating a third target output for the third training input, wherein the third target output identifies, for the third solid waste represented in the third images, a third waste label, among the plurality of waste labels, corresponding to soiled recyclable waste; and
  providing the training data to train the AI model on (i) a set of training inputs comprising the first training input, the second training input, and the third training input, and (ii) a set of target outputs comprising the first target output, the second target output, and the third target output.

2. The method of claim 1, wherein generating the training data further comprises:
  generating a fourth training input, the fourth training input comprising fourth data representing an environment represented in at least one of the first images of the first solid waste or the second images of the second solid waste, the environment absent solid waste;
  storing the fourth training input in the data store; and
  generating a fourth target output for the fourth training input, wherein the fourth target output identifies a fourth waste label, among the plurality of waste labels, corresponding to an absence of solid waste in the environment, and
  wherein (i) the set of training inputs comprises the fourth training input, and (ii) the set of target outputs comprises the fourth target output.

3. The method of claim 2, wherein the environment absent solid waste comprises a conveyor belt of a waste sorting system.

4. The method of claim 1, wherein generating the first training input comprises:
  initiating one or more control signals to cause a physical camera to capture the first images of solid waste.

5. The method of claim 1, wherein generating the first training input comprises:
  initiating a first control signal to slow a speed of a conveyor;
  initiating a second control signal to cause a physical camera to capture at least one of the first images of the first solid waste transported on the conveyor concurrent with the speed of the conveyor having slowed responsive to the first control signal; and
  subsequent to initiating the second control signal to cause the physical camera to capture the at least one of the first images of the first solid waste, initiating a third control signal to increase the speed of the conveyor.

6. The method of claim 1, wherein generating the first training input comprises:
  duplicating an original image of the first images of the first solid waste; and
  modifying the original image to generate one or more modified images, wherein modifying the original image comprises one or more of changing an exposure of the original image or saturating the original image, and wherein the first images comprise the one or more modified images.

7. The method of claim 1, wherein generating the training data further comprises:

generating a fifth training input, the fifth training input comprising fifth data representing fifth images of a fifth solid waste;

storing the fifth training input in the data store; and generating a fifth target output for the fifth training input, wherein the fifth target output identifies, for the fifth solid waste represented in the fifth images, a fifth waste label, among the plurality of waste labels, corresponding to organic waste, wherein (i) the set of training inputs comprises the fifth training input, and (ii) the set of target outputs comprises the fifth target output.

8. The method of claim 1, wherein generating the training data further comprises:

generating a sixth training input, the sixth training input comprising sixth data representing sixth images of a sixth solid waste;

storing the sixth training input in the data store; and generating a sixth target output for the sixth training input, wherein the sixth target output identifies, for the sixth solid waste represented in the sixth images, a sixth waste label, among the plurality of waste labels, corresponding to hazardous waste, and wherein (i) the set of training inputs comprises the sixth training input, and (ii) the set of target outputs comprises the sixth target output.

9. The method of claim 1, further comprising:

generating, using a physical camera maintained at a fixed position and fixed orientation relative to an environment of a waste processing facility, a plurality of images comprising the first images of the first solid waste and the second images of the second solid waste.

10. The method of claim 1, further comprising:

generating, using a physical camera that moves to different positions relative to an environment of a waste processing facility, a plurality of images comprising the first images of the first solid waste and the second images of the second solid waste.

11. The method of claim 1, wherein an environment represented in the first images and the second images is a same environment.

12. The method of claim 1, wherein the first images of the first solid waste represent the first solid waste in a plurality of conditions comprising at least two of an intact condition, a deformed condition, a soiled condition, a fragmented condition, or a compacted condition.

13. The method of claim 1, wherein the first images of the first solid waste represent the first solid waste in a plurality of orientations.

14. The method of claim 1, wherein generating the training data further comprises:

generating a seventh training input, the seventh training input comprising seventh data representing seventh images of a seventh solid waste;

storing the seventh training input in the data store; and generating a seventh target output for the seventh training input, wherein the seventh target output identifies, for the seventh solid waste represented in the seventh images, at least two waste labels among the plurality of waste labels, wherein the seventh solid waste comprises mixed waste having solid waste objects of different waste labels, and wherein (i) the set of training inputs comprises the seventh training input, and (ii) the set of target outputs comprises the seventh target output.

15. A method for using a trained artificial intelligence (AI) model with respect to information pertaining to characteristics of solid waste (SW), comprising:

generating, using a physical camera, one or more first images of a first solid waste object in an environment of a waste processing facility;

providing to the trained AI model a first input, the first input comprising first data representing the one or more first images of a first solid waste object in the environment of the waste processing facility;

obtaining, from the trained AI model, one or more outputs identifying (i) a first waste classification, among a plurality of waste classifications, of the first solid waste object in the environment represented in the one or more first images, and (ii) a first level of confidence that the first waste classification corresponds to the first solid waste object in the environment represented in the one or more first images;

determining whether the first level of confidence that the first waste classification corresponds to the first solid waste object in the environment represented in the one or more first images satisfies a threshold level of confidence; and responsive to determining that the first level of confidence satisfies the threshold level of confidence, initiating one or more first control signals that instruct a waste sorting system to move the first solid waste object to a specific waste stream, among a plurality of waste streams, corresponding to the first waste classification.

16. The method of claim 15, further comprising:

obtaining, from the trained AI model, the one or more outputs identifying (iii) a first waste sub-classification, among a plurality of waste sub-classifications for the first waste classification, of the first solid waste object in the environment represented in the one or more first images; and (iv) a first level of confidence that the first waste sub-classification corresponds to the first solid waste object in the environment represented in the one or more first images.

17. The method of claim 15, wherein the one or more first control signals control a conveyor system of the waste sorting system to move the first solid waste object to the specific waste stream.

18. The method of claim 15, wherein the one or more first control signals cause a rotary device to rotate to a predefined position to align a waste disposal container of a plurality of waste disposal containers into a position to capture the first solid waste object.

19. The method of claim 18, wherein the one or more first control signals are sent by a microcontroller that causes a servo motor to rotate radially and align the waste disposal container into the position to capture the first solid waste object.

20. The method of claim 18, wherein initiating the one or more first control signals that instruct the waste sorting system to move the first solid waste object to the specific waste stream, among the plurality of waste streams, corresponding to the first waste classification comprises:

receiving, via a sensing device coupled to the waste disposal container, an indication that the waste disposal container contains a threshold amount of waste; and responsive to receiving the indication, initiating a control signal of the one or more first control signals that causes the waste disposal container to empty.

21. The method of claim 15, further comprising:

generating, using the physical camera, one or more second images of mixed solid waste in the environment of the waste processing facility;

providing to the trained AI model a second input, the second input comprising second data representing the one or more second images of the mixed solid waste in the environment of the waste processing facility; and obtaining, from the trained AI model, one or more outputs identifying (i) a second waste classification, among the plurality of waste classifications, of a second solid waste object of the mixed solid waste in the environment represented in the one or more second images, (ii) a second level of confidence that the second waste classification corresponds to the second solid waste object in the environment represented in the one or more second images, (iii) a third waste classification, among the plurality of waste classifications, of a third solid waste object of the mixed solid waste in the environment represented in the one or more second images, (iv) a third level of confidence that the third waste classification corresponds to the third solid waste object in the environment represented in the one or more second images.

22. The method of claim 21, further comprising:

determining whether the fourth level of confidence that the fourth waste classification corresponds to the absence of solid waste objects in the environment represented in the one or more third images satisfies a threshold level of confidence; and responsive to determining that the fourth level of confidence satisfies the threshold level of confidence, refraining from initiating one or more control signals that instruct a waste sorting system to move solid waste objects to a specific waste stream, among a plurality of waste streams.

23. The method of claim 15, further comprising:

generating, using the physical camera, one or more third images of the environment of the waste processing facility;

providing to the trained AI model a third input, the third input comprising third data representing the one or more third images of the environment of the waste processing facility; and obtaining, from the trained AI model, one or more outputs identifying (i) a fourth waste classification, among the plurality of waste classifications, of an absence of solid waste objects in the environment represented in the one or more third images, and (ii) a fourth level of confidence that the fourth waste classification corresponds to the absence of solid waste objects in the environment represented in the one or more third images.

24. The method of claim 15, wherein the physical camera is maintained at a fixed position and fixed orientation relative to the environment of the waste processing facility.

25. The method of claim 15, wherein the physical camera is configured to move to different positions relative to the environment of the waste processing facility.

26. A system comprising:

a memory;

a physical camera; and one or more processing devices coupled to the memory and the physical camera, the one or more processing devices configured to perform operations comprising:

generating, using the physical camera, one or more first images of a first solid waste object in an environment of a waste processing facility;

providing to the trained AI model a first input, the first input comprising first data representing the one or more first images of a first solid waste object in the environment of the waste processing facility;

obtaining, from the trained AI model, one or more outputs identifying (i) a first waste classification, among a plurality of waste classifications, of the first solid waste object in the environment represented in the one or more first images, and (ii) a first level of confidence that the first waste classification corresponds to the first solid waste object in the environment represented in the one or more first images;

determining whether the first level of confidence that the first waste classification corresponds to the first solid waste object in the environment represented in the one or more first images satisfies a threshold level of confidence; and responsive to determining that the first level of confidence satisfies the threshold level of confidence, initiating one or more first control signals that instruct a waste sorting system of the waste processing facility to move the first solid waste object to a specific waste stream, among a plurality of waste streams, corresponding to the first waste classification.

* * * * *